US012504281B1

(12) United States Patent
Malshe et al.

(10) Patent No.: US 12,504,281 B1
(45) Date of Patent: Dec. 23, 2025

(54) DESIGNING STORAGE PODS WITH LAYERS OF BINS OR SLOTS

(71) Applicant: Amazon Technologies, Inc., Seattle, WA (US)

(72) Inventors: Rohit Malshe, Kirkland, WA (US); Renan Garcia, Austin, TX (US); Dipal Patel Gupta, Issaquah, WA (US); Jin Ye, Kirkland, WA (US); Liron David Yedidsion, Redmond, WA (US); Abhilasha Prakash Katariya, Issaquah, WA (US); Chinmoy Mohapatra, Bellevue, WA (US); David Joseph Gasperino, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 516 days.

(21) Appl. No.: 17/843,660

(22) Filed: Jun. 17, 2022

(51) Int. Cl.
*G01B 21/02* (2006.01)

(52) U.S. Cl.
CPC .................. *G01B 21/02* (2013.01)

(58) Field of Classification Search
CPC ..................................... G01B 21/02
See application file for complete search history.

(56) References Cited

U.S. PATENT DOCUMENTS

| | | | | |
|---|---|---|---|---|
| 9,460,524 B1* | 10/2016 | Curlander | ............ | G06V 20/20 |
| 2008/0074013 A1* | 3/2008 | Ahlgrim | ............ | A47B 43/02 |
| | | | | 312/257.1 |
| 2016/0236867 A1* | 8/2016 | Brazeau | ............ | B25J 5/007 |
| 2017/0073159 A1* | 3/2017 | Lossov | ............ | G07F 11/165 |
| 2019/0321925 A1* | 10/2019 | Chheda | ............ | B23P 19/10 |
| 2021/0323767 A1* | 10/2021 | Liu | ............ | B66F 9/183 |
| 2022/0297733 A1* | 9/2022 | Pajevic | ............ | B65D 21/086 |

OTHER PUBLICATIONS

Gilmore, P. C. and R. E. Gomory. Multistage cutting stock problems of two and more dimensions. Operations Research, 13(1):94-120, 1965.
Wascher, G., H. Hausner, and H. Schumann. An improved typology of cutting and packing problems. European Journal of Operational Research, 183:1109-1130, 2007, accessed Jun. 17, 2022 URL: https://www.mansci.ovgu.de/mansci_media/publikationen/2007/typology-EGOTEC-5t0pvr6fjifln4r4oav60tt612.pdf.

* cited by examiner

*Primary Examiner* — Hyun D Park
(74) *Attorney, Agent, or Firm* — Athorus, PLLC

(57) ABSTRACT

A pod is designed to include layers of bins or slots for accommodating items. The pod includes a frame having fixed dimensions, e.g., heights, depths and widths, and opposing exposed frames. The layers have heights and depths that are defined by the respective bins or slots, and aggregate widths that are consistent with widths of the pods. Where a set of items is known, the items are assumed to have cuboidal shapes, and subsets of the items having one, two, three or four of the items are defined. Subsets assigned to bins or slots of a layer, such that one of the items is assigned to only one bin or slot. A number of layers required to store, sort or route the subsets of items throughout a facility may be determined, and installed within any number of pods.

22 Claims, 16 Drawing Sheets

CUBOID REPRESENTING TRIPLET OF ITEMS DETERMINED ACCORDING TO MERGE FUNCTION

SET OF LAYERS OF BINS

SUBSETS OF ITEMS ASSIGNED TO BINS OF LAYERS
TO MINIMIZE UTILIZED VOLUME WITHIN BINS

ESTABLISH LAYERS IN
OPPOSING FACES OF
POD FRAME

SELECT SLOT FOR SUBSET TO
MINIMIZE $V_{SLOT} - V_{SUBSET}$

DESIGNING STORAGE PODS WITH LAYERS OF BINS OR SLOTS

BACKGROUND

Contemporary electronic marketplaces are able to offer a wide variety of groups or types of items (e.g., goods, services, information, and/or media of any type or form) to customers who may be located in virtually any area of the globe, in any number of ways. For example, items may be delivered in one or more containers to a warehouse, a fulfillment center or another facility operated by an electronic marketplace from one or more sellers, vendors, manufacturers or other sources. Upon arriving at the fulfillment center, the warehouse or the other facility, such items may be unpacked or otherwise removed from their respective containers and transported to one or more locations. When a customer places an order for one or more of the items, the items may be retrieved from a location and transported to a workstation for packaging in one or more containers or otherwise prepared for delivery to the customer.

In warehouses, fulfillment centers or other like facilities for receiving, storing or distributing items, pods are structures that are commonly used for storing, sorting or routing items within such facilities. A pod may include a substantially rigid frame having fixed dimensions (e.g., a height, a width and a depth) that is configured to support bins, slots or other features or spaces into which any number of items may be deposited, either individually or with one or more other items. In some implementations, a pod may be placed on a floor or another traveling surface within a warehouse, a fulfillment center or another like facility, and items may be deposited therein by humans or any number of machines. A pod may also be configured for mounting onto a human-powered or autonomous vehicle, e.g., an autonomous mobile robot, that may transport or carry the pod and any items thereon throughout any such facility.

Bins or slots that are provided within pods may be formed from any type of materials, such as one or more combinations of fabrics, metals, plastics or other suitable materials, which may be selected based on any attributes of the items that are to be deposited therein for storage, sortation or routing. Likewise, bins or slots that are provided within such pods may have any dimensions, shapes or sizes, which may also be selected on any basis, including but not limited to the types of such items, which may also have any dimensions, shapes or sizes.

Pods and bins or slots may be designed or selected in any number of ways, and based on any criteria, based on anticipated numbers or types of items to be stored, sorted or routed within such bins or slots and on such pods. Properly designing pods or selecting bins or slots for use in such pods may increase the efficiency of operations within a facility in which the pods and bins or slots are utilized, such as by increasing stow speeds or decreasing times required to search for and pick or retrieve items therein or therefrom. Because the flow of items through a facility may change over time, or from season to season, or from location to location, pods having different designs may be preferable for use in the same facility at different times, or at different facilities in various locations.

DETAILED DESCRIPTION

As is set forth in greater detail below, the present disclosure is directed to designing storage pods with bins or slots in layers. More specifically, systems and methods of the present disclosure are directed to optimizing a pod, or any number of pods, that are required to pack a set of items thereon or therein. The set of items may be an actual, known set of items that has been identified on any basis, or a theoretical set of items that has been identified based on historical experiences, which may require storage in a given facility, or for any occasion. The items must be packed on or in a set of bins or slots that are selected and arranged in a way that maximizes an available space or volume of a pod to store, sort or route items within a facility, such as a warehouse or a fulfillment center, and minimizes unutilized portions of the space or volume accordingly. Pods may be mounted atop autonomous mobile robots or other machines, or on hanging pulleys or other systems, or may be otherwise manually or automatically moved within a facility, as necessary.

Figure 1:
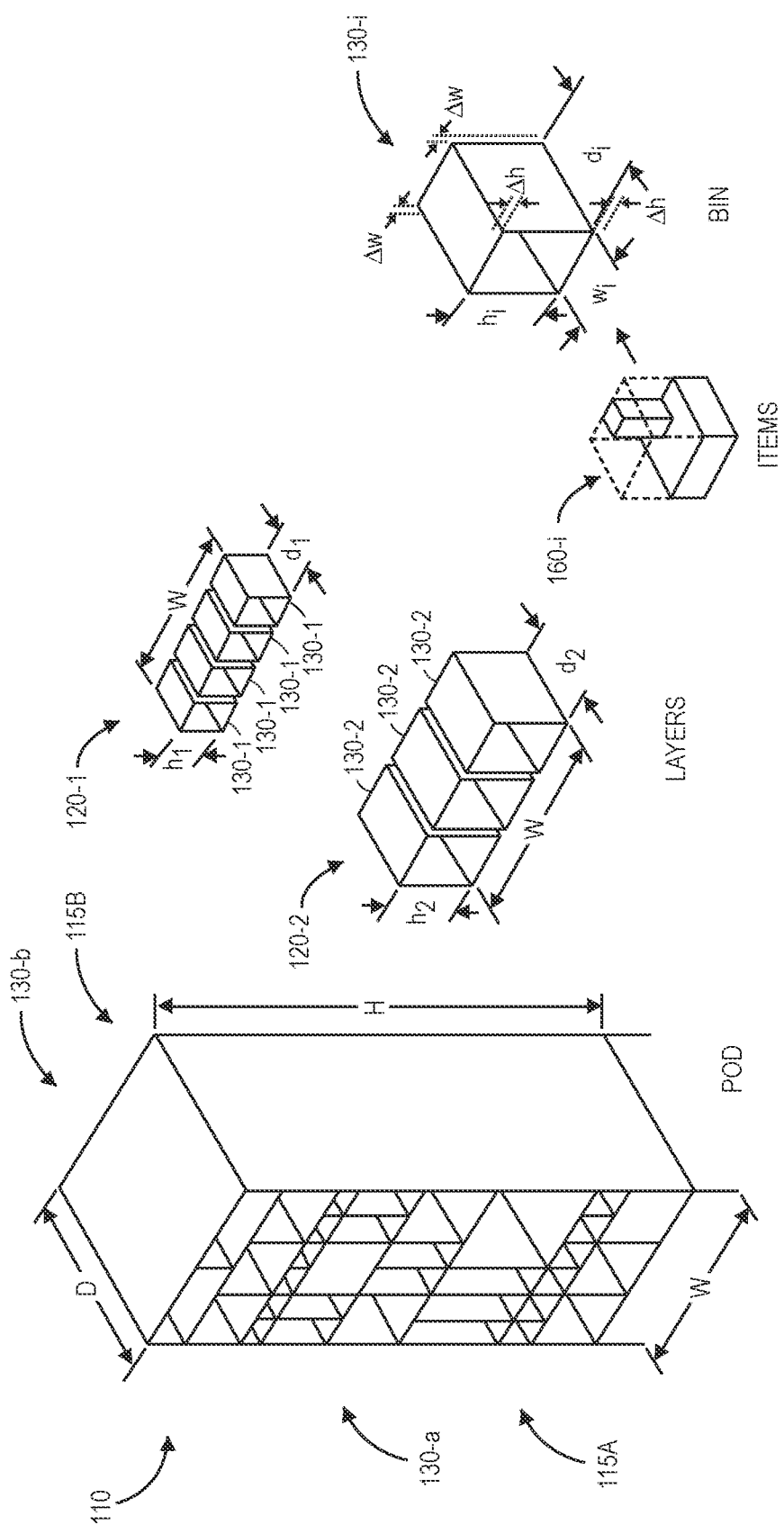
FIG. 1 is a view of aspects of one system for designing storage pods in accordance with embodiments of the present disclosure.

Referring to FIG. 1, views of aspects of one system for designing storage pods in accordance with embodiments of the present disclosure, including a representative pod 110, a pair of representative layers 120-1, 120-2 of bins, and a representative bin 130-$i$, are shown. The pod 110 includes a frame defining a space or volume having any number of layers of bins or slots for accommodating items therein. The frame of the pod 110 may be formed from any suitable materials such as metals, woods, plastics (e.g., injection molded plastics), or other materials. As is shown in FIG. 1, the space or volume of the pod 110 has an internal height H, an internal depth/) and an internal width W, with a plurality of layers 130-$a$, 130-$b$ of bins or slots that may be accessed via either of a pair of exposed faces 115A, 115B that are provided on opposing sides of the pod 110. Each of the layers 130-$a$, 130-$b$ may be arranged such that the bins or slots therein have constant heights and span across the internal width W of the frame of the pod 110, and may have common or varying depths into the layers 130-$a$, 130-$b$ from the respective exposed faces 115A, 115B.

In accordance with implementations of the present disclosure, the pod 110 may accommodate sets of layers of bins or slots, including the layers 120-1, 120-2 shown in FIG. 1, or any other layers (not shown), having any number of bins or a slot. As is shown in FIG. 1, the layer 120-1 includes four bins 130-1 (or slots) that are aligned in a row, with each of the bins 130-1 having a common height $h_1$ and a common depth $d_1$. Each of the bins 130-1 includes an internal space or volume for accommodating one or more items therein that is defined by a top and a bottom face, a left face and a right face, and a rear face. In lieu of a front face, each of the bins 130-1 includes an opening through which one or more items may be inserted into the internal space or volume or removed therefrom.

A combined width of the four bins 130-1 in the layer 120-1 is approximately equal to, and not greater than, the width W of the space or volume defined by the frame of the pod 110, such that the layer 120-1 may be established in the pod 110, e.g., via one of the faces 115A, 115B.

Likewise, the layer 120-2 includes three bins 130-2 (or slots) that are aligned in a row, with each of the bins 130-2 having a common height $h_2$ and a common depth $d_2$. Like the bins 130-1, each of the bins 130-2 includes an internal space or volume for accommodating one or more items therein that is defined by a top and a bottom face, a left face and a right face, and a rear face. In lieu of a front face, each of the bins 130-2 includes an opening through which one or more items may be inserted into the internal space or volume or removed therefrom.

A combined width of the three bins 130-2 in the layer 120-2 is also approximately equal to, and not greater than, the width W of the space or volume defined by the frame of the pod 110, such that the layer 120-2 may be established in the pod 110, e.g., via one of the faces 115A, 115B.

Any number of layers of any type or form, or including any number of bins or slots, may be established within the internal space or volume defined by the frame of the pod 110 by way of either of the faces 115A, 115B, in any manner in accordance with implementations of the present disclosure. For example, in some implementations, the bins or slots may be defined using one or more components that may be manually or automatically fitted or installed within the internal space or volume defined by the frame of the pod 110, in vertical or horizontal orientations, in order to establish layers of the pod 110 of any height, width or depth. Alternatively, in some implementations, the bins or slots may be receptacles or open containers that may be placed onto platforms or other surfaces within the internal space or volume defined by the frame of the pod 110, and one or more items may be dropped or placed into specific ones of the bins or slots accordingly. In still other implementations, the bins or slots may be rigid cabinets, closets, drawers or other features that may be opened or removed, at least in part, to insert items therein or therefrom. Moreover, such layers, or the bins or slots within such layers, may be mounted or fitted, installed, mounted or otherwise placed within a frame of a pod in any manner, e.g., by any number of rails, hooks, pins, tracks or other systems.

An aggregate height of the layers established in either of the faces 115A, 115B may not exceed the height H of the space or volume defined by the frame of the pod 110.

Moreover, because layers of pods are to be established in the frame of the pod 110 via the faces 115A, 115B on opposing sides of the pod 110, a sum of depths of layers established in the pod 110, e.g., the depth $d_1$ of the bins 130-1 of the layer 120-1 and the depth de of the bins 130-2 of the layer 120-2, may not exceed the depth D) of the space or volume defined by the frame of the pod 110. In some implementations, a sum of a maximum depth of any layer established within the face 115A, and any layer established within the face 115B, may not exceed the depth I). In some other implementations, such as where layers established within each of the faces 115A, 115B have varying depths, sums of depths of layers at common or similar heights or strata within the space or volume defined by the frame of the pod 110 on either of the faces 115A, 115B may not exceed the depth I).

As is further shown in FIG. 1, the representative bin 130-$i$ (or slot) includes an internal space or volume having dimensions such as a height $h_i$, a depth $d_i$ and a width $w_i$. The dimensions of the bin 130-$i$ may be compared to dimensions of an item, or a subset of items, to determine whether the item or the subset of items may be accommodated within the bin 130-$i$. Additionally, the bin 130-$i$ may be formed from any suitably durable materials including but not limited to natural or synthetic leathers or canvases, plastics, rubbers, woven or non-woven fabrics, or other like materials which may be formed in one or more layers, as well as metals, woods, plastics (e.g., injection molded plastics), rubbers or other materials.

Where a predetermined number of any of the representative bin 130-$i$ (or slot) are provided in a layer, the overall width of the layer may be calculated by summing the widths $w_i$ for each of the bins 130-$i$ in the layer, which may be the same (e.g., homogenous) as one another or different (e.g., heterogenous), as well as widths $\Delta w_i$ of horizontal spaces between adjacent bins 130-$i$, or widths $\Delta w_i$ of spaces between bins on ends of the layers and interior surfaces of the frame of the pod 110. Likewise, where a predetermined number of any of the representative bin 130-$i$ (or slot) are to be aligned vertically and established within the frame of the pod 110, the overall height of the layers may be calculated by summing the heights $h_i$ for each of the bins 130-$i$ in the layer, which may be the same as one another or different, as well as heights Ahi of vertical spaces above or below the bins 130-$i$, or heights Ah, between uppermost bins and the frame of the pod 110, or between lowermost bins 130-$i$ and the frame of the pod 110.

In accordance with implementations of the present disclosure, a number of pods required to store, sort or route a set of items may be minimized by defining subsets of the set of items that may fit within bins or slots of predefined layers, based on comparisons of dimensions of the subsets of the items to dimensions of the bins or slots. For example, a set of layers may be defined to include bins or slots having heights or depths that are discrete fractions of the height H or the depth D), respectively. Additionally, the bins or slots of the sets of layers may also have widths that are discretized fractions of the width W. The bins or slots may be arranged in layers within a pod in a manner that maximizes the utilization of a space or volume within the pod to accommodate predefined subsets of items, e.g., in cuboidal shapes, and minimizes the unutilized portions of the space or volume. Likewise, items or subsets of items may be assigned to respective bins or slots in a manner that maximizes the utilization of spaces or volumes within the bins or slots, and minimizes the unutilized portions of the spaces or volumes.

The systems and methods of the present disclosure may be utilized to efficiently store, sort or route any number of items within any facility of any type or form. In some implementations, a pod, or any number of pods, may be designed to include any number of layers, each having any number of layers of bins or slots for accommodating a predetermined number of items. Subsets including one, two, three, four or more items may be defined, e.g., according to a merge function, and such subsets may be assigned to individual bins or slots, with layers of the bins or slots being established within a sufficient number of pods to accommodate each of such items.

When an item or a subset of items is assigned to a given bin or slot, information associating the item or subset with the bin or the slot and a layer and pod in which the bin or slot is located may be stored in one or more files or records maintained in a data store (or multiple data stores). A human (e.g., an associate) or machine may be instructed to travel to a location at which a pod including the bin or slot is located, and to retrieve the item or subset therefrom, or deposit the item or subset therein. Moreover, pods, layers, bins or slots of the present disclosure may include any number of identifying features that enable a human or a machine to recognize such pods, layers, bins or slots. For example, in some implementations, a pod, a layer, a bin or a slot may include one or more visible markings that may be read, recognized or interpreted by a human eye or an imaging device, and used to determine which of the layers, bins or slots of a pod to which a given item or subset of items is assigned. Alternatively, in some implementations, a pod, a layer, a bin or a slot may include one or more lights or other indicators that a given item is to be deposited therein or removed therefrom. In still other implementations, a projector or another light source may project light onto a specific pod, layer, bin or slot to which an item or subset of items has been assigned.

Alternatively, in some implementations, where a large number of items is known to require storage, sortation or routing, or is predicted to require storage, sortation or routing, subsets of one, two, three, four or more of the large number of items may be defined, e.g., according to a merge function, and such subsets may be assigned to individual bins or slots. A number of the layers including the bins or slots to which subsets have been assigned may be determined accordingly, and such layers may be established within any number of frames of pods, as necessary, subject to limitations on heights, depths and widths of the layers with respect to the frames of the pods. A number of the pods required to store, sort or route the items may be determined based on the types and forms of layers.

In some implementations, the systems and methods of the present disclosure may be utilized to design a single type or class of pod, or multiple types or classes of pods, based on average or expected numbers of items that must be stored, sorted or routed within a facility, or any number of facilities, on a single occasion or on a rolling or repeated basis. Subsets of such items may be defined, e.g., according to a merge function, and a pod that most efficiently accommodates the items that are known or predicted to require storage, sortation or routing, and layers of bins or slots for accommodating the items may be defined and established within the pod or pods.

In some implementations, such as is shown in FIG. 1, a pod may be a free-standing structure or fixture that may be placed on a surface of a facility, or transported throughout the facility via one or more autonomous mobile robots or other machines or systems. Alternatively, a pod may be an established fixture within or on a vehicle, such as a truck, a train (e.g., a container), an aircraft, or others. For example, where internal dimensions of a vehicle for storing, sorting or routing items are known, layers of bins or slots for accommodating items or subsets thereof may be selected and established within the vehicle in accordance with implementations of the present disclosure.

The terms "bin" and "slot" may refer to any system for accommodating an item, or a subset of items, that may be arranged in a layer of one or more bins or slots and established within a space or a volume of a frame of a pod, regardless of how the bins or slots are formed, arranged in the layer, or established within the frame of the pod. The terms "bin" and "slot" may be used interchangeably herein.

Figure 2:
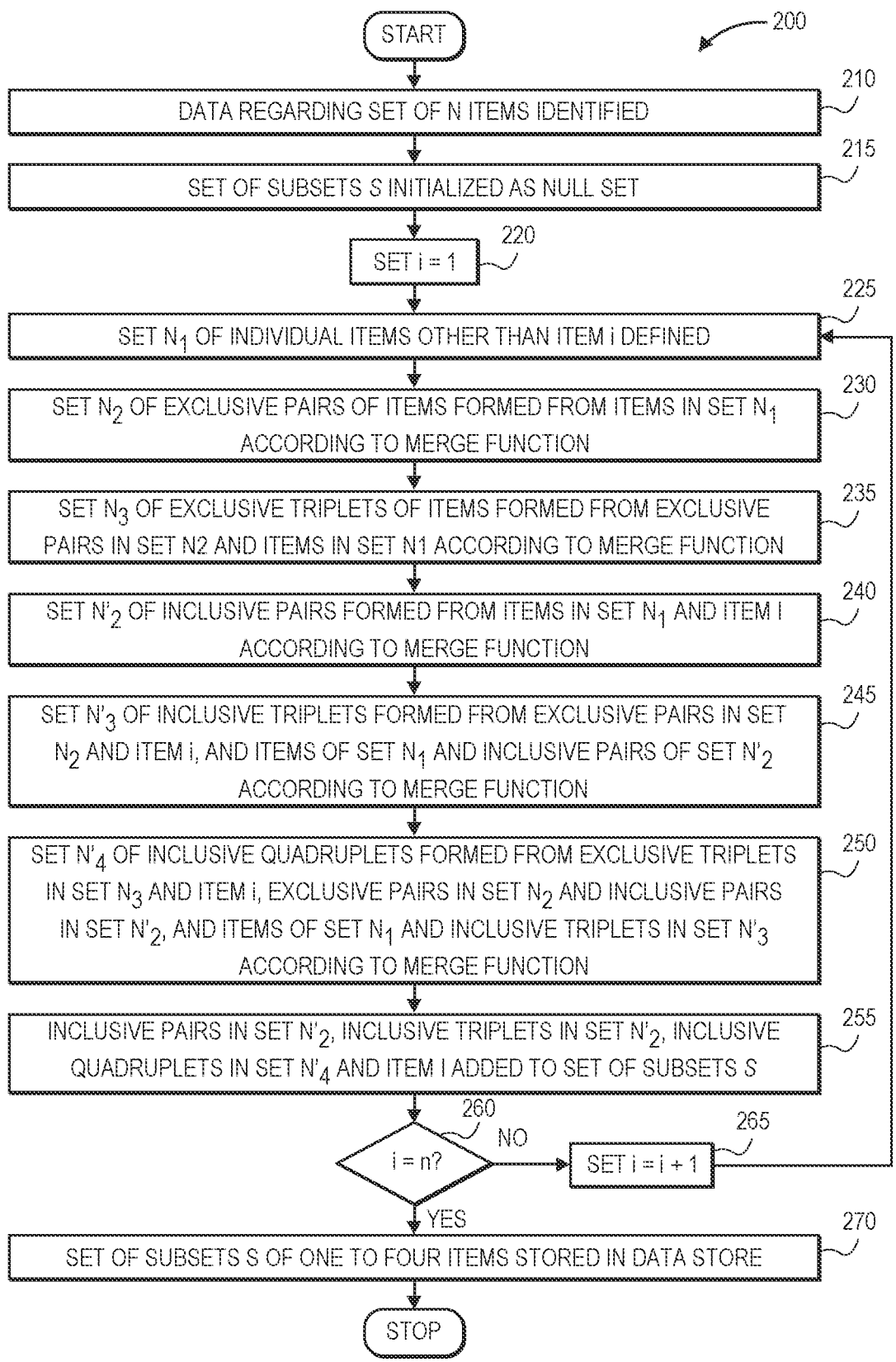
FIG. 2 is a flow chart of one process for designing storage pods in accordance with embodiments of the present disclosure.

Referring to FIG. 2, a flow chart 200 of one process for designing storage pods in accordance with embodiments of the present disclosure is shown. The process represented in the flow chart 200 is intended to enumerate feasible subsets of items that include one to four items. Alternatively, those of ordinary skill in the pertinent arts will recognize that the process represented in the flow chart 200 may be modified to enumerate feasible subsets having more than four items, or fewer than four items, in accordance with implementations of the present disclosure.

At box 210, data regarding a set of n items is identified. The n items may be of any type or form, and may have been obtained or may be available from any source.

In some implementations, each of the n items may be assumed to have a shape or a volume of a cuboid, e.g., a solid having six rectangular faces at right angles to each other. For example, a shape of an item, or a volume occupied by the item, may be assumed to be a three-dimensional rectangular solid having a maximum depth of the item, a maximum width of the item and a maximum height of the item. Alternatively, where detailed information regarding actual shapes or volumes of the n items is known, the n items may be assumed to have their actual shapes, or to occupy their actual volumes.

Moreover, in some implementations, each of the n items may have any dimensions or masses. In some other implementations, the n items may be filtered to exclude items having one or more dimensions that exceed a dimension of a pod, e.g., a depth, a width or a height that are greater than a depth, a width or a height of a space or volume for accommodating items within the pod, or to exclude items having masses or volumes that exceed a maximum capacity of the pod. Where dimensions or capacities of bins or slots that may be established in a pod for accommodating items therein are known, the n items may be filtered to exclude items that may not fit into any of the bins or slots, or items that have masses or volumes that cannot be accommodated by any of the bins or slots.

At box 215, a set of subsets S is initialized as a null set, or a set that initially does not include any subsets of the n items. At box 220, a value of a step variable i is set equal to one, or i=1.

At box 225, a set $N_1$ of individual items other than item i is defined.

At box 230, a set $N_2$ of exclusive pairs of items in the set $N_1$, e.g., subsets of two of the n items that include the item i, is formed according to a merge function. For example, the merge function may be defined to receive sets of information regarding pairs of cuboids, e.g., cuboids representing individual items or cuboids representing merged combinations of items, and to generate a set of information identifying cuboids that may be formed from orthogonally rotated pairwise mergings of the pairs of cuboids. The cuboids identified by the merge function may be filtered to exclude cuboids having any dimensions that exceed a dimension of a pod, a bin or a slot, e.g., a depth, a width or a height that are greater than a depth, a width or a height of a space or volume for accommodating items within the pod, the bin or the slot, or to exclude items having masses or volumes that exceed a maximum capacity of the pod, the bin or the slot.

The set $N_2$ may include disjoint single items in the set $N_1$ that are combined with other single items in the set $N_1$, according to the merge function, but are not combined with the item i.

At box 235, a set $N_2$ of exclusive triplets, e.g., subsets of three of the n items that do not include the item i, is formed from combinations of the exclusive pairs in the set $N_2$ formed at box 230 and items in the set $N_1$ defined at box 225 according to the merge function. For example, the set $N_3$ may include exclusive pairs of items in the set $N_2$ that are combined with other disjoint individual single items in the set Ny, according to the merge function, but are not combined with the item i.

At box 240, a set $N'_2$ of inclusive pairs, e.g., subsets of two of the n items that include the item i, is formed from combinations of disjoint individual single items in the set $N_1$ and the item i, according to the merge function.

At box 245, a set $N'_3$ of inclusive triplets, e.g., subsets of three of the n items that include the item i, is formed from combinations of the exclusive pairs in the set $N_2$ formed at box 230 and the item i, and from combinations of items in the set $N_1$ and the inclusive pairs in set $N'_2$ formed at box 240, according to the merge function.

At box 250, a set $N'_4$ of inclusive quadruplets, e.g., subsets of four of the n items that include the item i, is formed from combinations of the exclusive triplets in the set $N_3$ formed at box 235 and the item i, as well as combinations of the exclusive pairs in the set $N_2$ formed at box 230 and the inclusive pairs in the set $N'_2$ formed at 240, and combinations of the items of the set $N_1$ and the inclusive triplets in the set $N'_3$ formed at box 245, according to the merge function.

At box 255, the inclusive pairs in the set $N'_2$ formed at box 240, the inclusive triplets in the set $N'_3$ formed at box 245, and the inclusive quadruplets in the set $N'_4$ formed at box 250, and the item i are added to the set of subsets S.

At box 260, whether the value of the step variable i is equal to n, or i=n, is determined. If the value of the step variable i is not equal to n, then the process advances to box 265, where the value of the step variable i is incremented by one, or set equal to i+1, before returning to box 225, where a new set $N_1$ of individual items other than the item i is defined.

If the value of the step variable i is equal to n, however, then the process advances to box 270, where the set of subsets S, each including up to four of the items n, is stored in one or more data stores, and the process ends. Each of the subsets S includes a cuboidal shape or volume that includes one, two, three or four of the n items identified subject to constraints of the pod or any bins to be used thereon, including but not limited to dimensions or other capacities of the pod or such bins.

One or more techniques may be applied to limit a size of the set of subsets S defined according to the process represented in the flow chart 200 of FIG. 2. In some implementations, the set of n items may be partitioned into disjoint subsets, e.g., a set $n_1$, a set $n_2$, a set $n_3$, or others, and set of subsets S including cuboidal shapes or volumes may be identified for each of the disjoint subsets of the set of n items. Next, in some implementations, only non-dominated cuboids need be maintained within the set of subsets S, e.g., to minimize redundancies due to symmetries. Furthermore, in some implementations, where multiple subsets of items are identified to include the same items, the set of subsets S may be filtered to include only a subset having a minimum volume of a merged cuboid of the items.

Accordingly, the process represented in the flow chart 200 of FIG. 2 may be utilized to generate any number of subsets of items, with the items arranged with respect to one another in any manner. The subsets may be filtered or downselected to remove dominated subsets, e.g., subsets including a group of items that do not have any dimension that is smaller or more favorable than any other subset including that same group. Alternatively, the subsets may be filtered or downselected to include only non-dominated subsets, e.g., subsets including a group of items that have the most favorable dimensions of each of the subsets including that same group.

Those of ordinary skill in the pertinent arts will recognize that the process represented in the flow chart 200 of FIG. 2 may be modified to generate subsets having any number of the n items, e.g., fewer than four, or greater than four, in accordance with implementations of the present disclosure. The process represented in the flow chart 200 of FIG. 2 is not limited to identifying subsets S having one, two, three or four of the n items.

Referring to FIGS. 3A through 3D, views of aspects of one system for designing storage pods in accordance with embodiments of the present disclosure are shown. Except where otherwise noted, reference numerals preceded by the number "3" in FIGS. 3A through 3D refer to elements that are similar to elements having reference numerals preceded by the number "1" shown in FIG. 1.

Figure 3A:
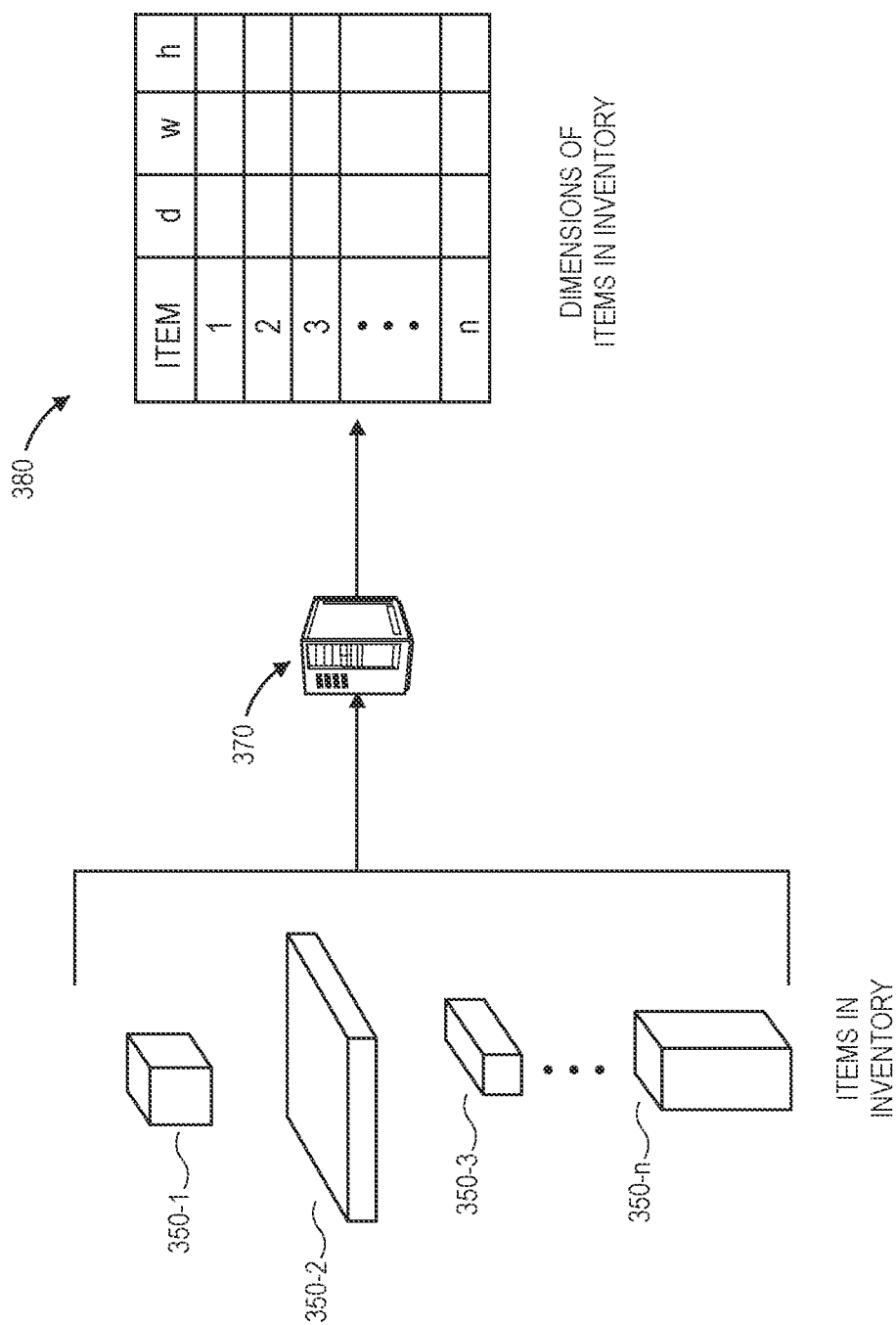
FIGS. 3A through 3D are views of aspects of one system for designing storage pods in accordance with embodiments of the present disclosure.

As is shown in FIG. 3A, a server 370 or another computer device or system includes information 380 regarding dimensions of a plurality of items 350-1, 350-2, 350-3 . . . 350-$n$ stored thereon, e.g., in one or more files or records. The information 380 may include depths of the items 350-1, 350-2, 350-3 . . . 350-$n$, as well as widths of such items and heights of such items, or any other information or data regarding the items, e.g., masses of such items, volumes of such items, any handling restrictions for such items, or any other information or data. In some implementations, the items 350-1, 350-2, 350-3 . . . 350-$n$ may be assumed to have cuboidal shapes, or to be three-dimensional rectangular solids having heights, depths or widths defined by maximum dimensions of the respective items.

The server 370 may be programmed or configured to generate subsets of the items 350-1, 350-2, 350-3 . . . 350-$n$ based on the information 380 regarding the dimensions of the items. For example, as is discussed above, the server 370 may execute a merge function that receives sets of information regarding pairs of the items 350-1, 350-2, 350-3 . . . 350-$n$ or subsets of as inputs, e.g., cuboidal shapes of such items or subsets, and generates a set of information regarding subsets of items having cuboidal shapes formed from orthogonal rotations of the respective items or subsets, e.g., independently or with respect to one another. Results generated by the merge function may be filtered to exclude cuboids having any dimensions that exceed a dimension of a pod, or dimensions that exceed dimensions of any bins of any layers.

Figure 3B:
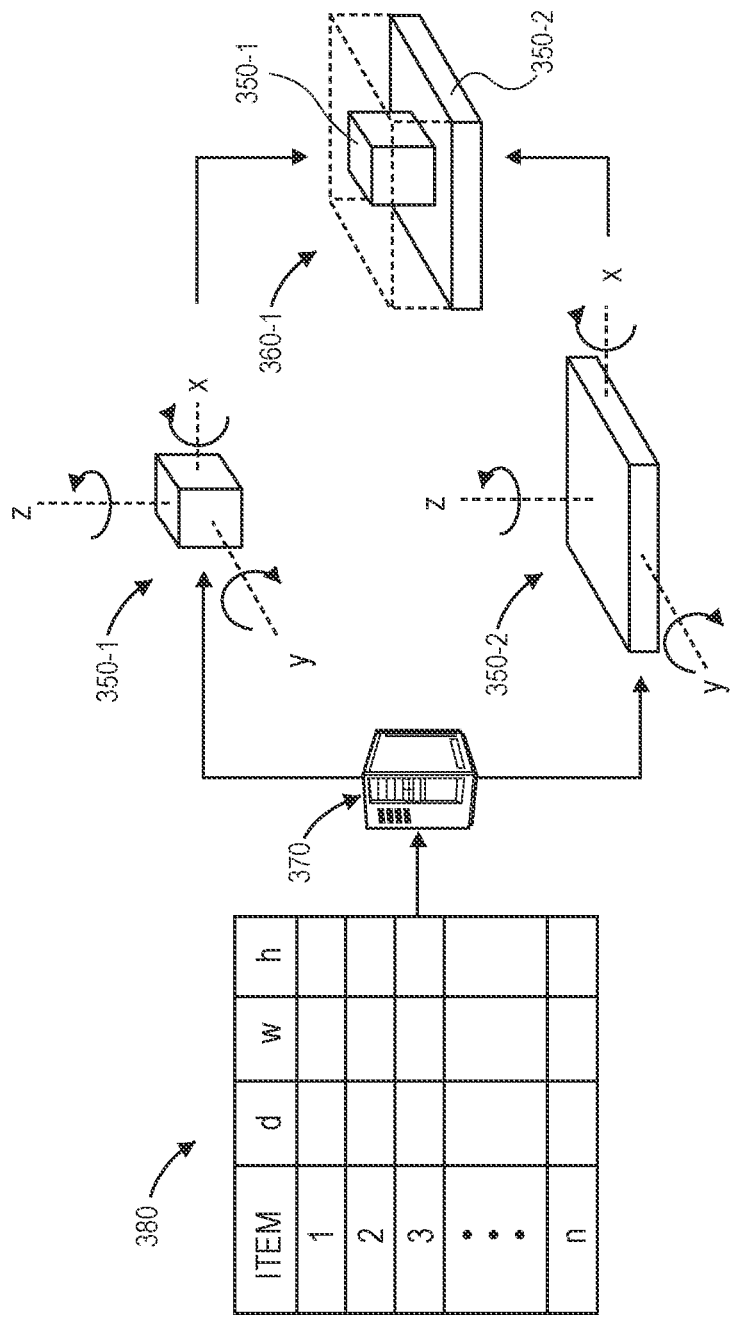

As is shown in FIG. 3B, the server 370 may process the information 380 to generate a cuboid 360-1 representing a pair of items, viz., the item 350-1 and the item 350-2, according to a merge function. The server 370 may select an orientation for each of the item 350-1 and the item 350-2, and determine that the cuboid 360-1 has the minimum dimensions of any combination of the items 350-1, 350-2, or otherwise occupies a smallest volume of any such combination. Dimensions of the cuboid 360-1 may be determined and stored in association with the information 380. Alternatively, the server 370 may generate multiple cuboids, and determine and store dimensions of such cuboids in association with the information 380.

Figure 3C:
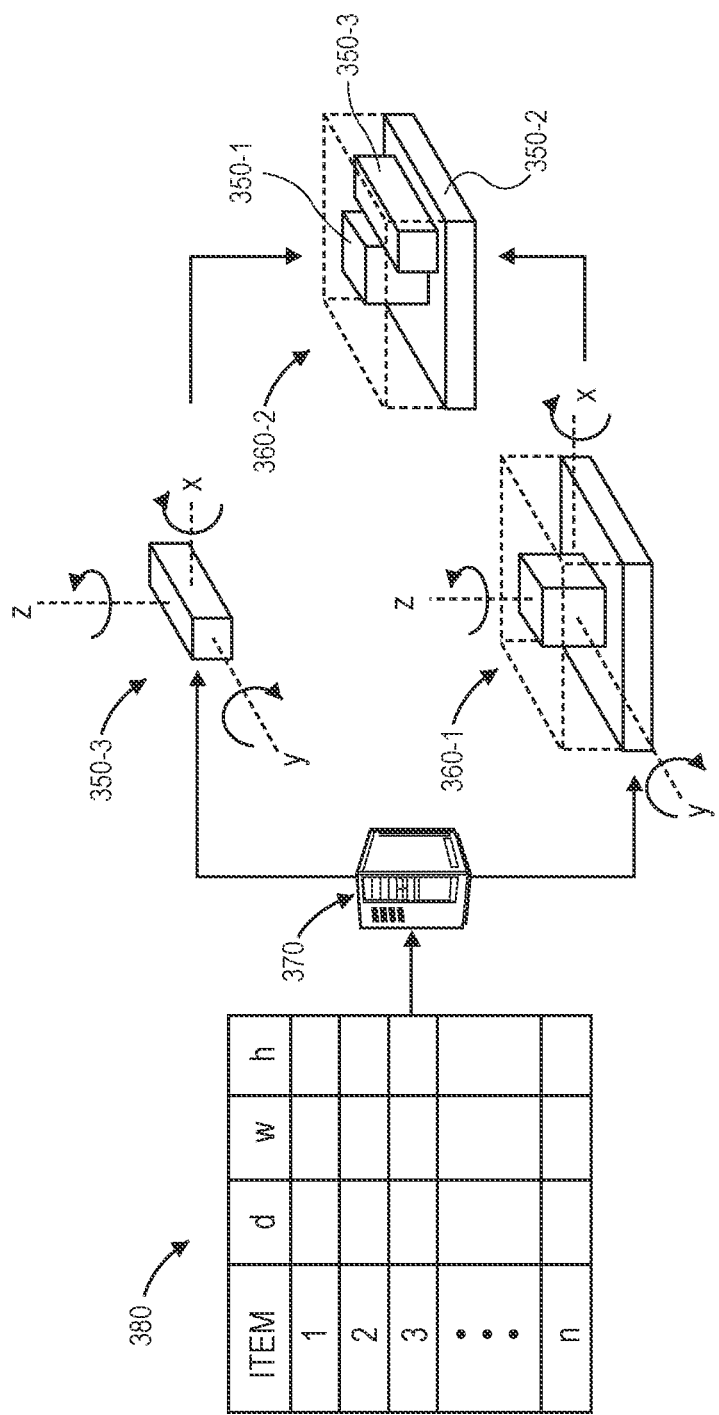

As is shown in FIG. 3C, the server 370 may process the information 380, and any corresponding information regarding the cuboid 360-1, to generate a cuboid 360-2 representing a combination of the item 350-3 and the cuboid 360-1 according to a merge function. The server 370 may select an orientation for each of the item 350-3 and the cuboid 360-1, and determine that the cuboid 360-2 has the minimum dimensions of any combination of the item 350-1 and the cuboid 360-1, or otherwise occupies a smallest volume of any such combination. Dimensions of the cuboid 360-2 may be determined and stored in association with the information 380. Alternatively, the server 370 may generate multiple cuboids, and determine and store dimensions of such cuboids in association with the information 380.

Figure 3D:
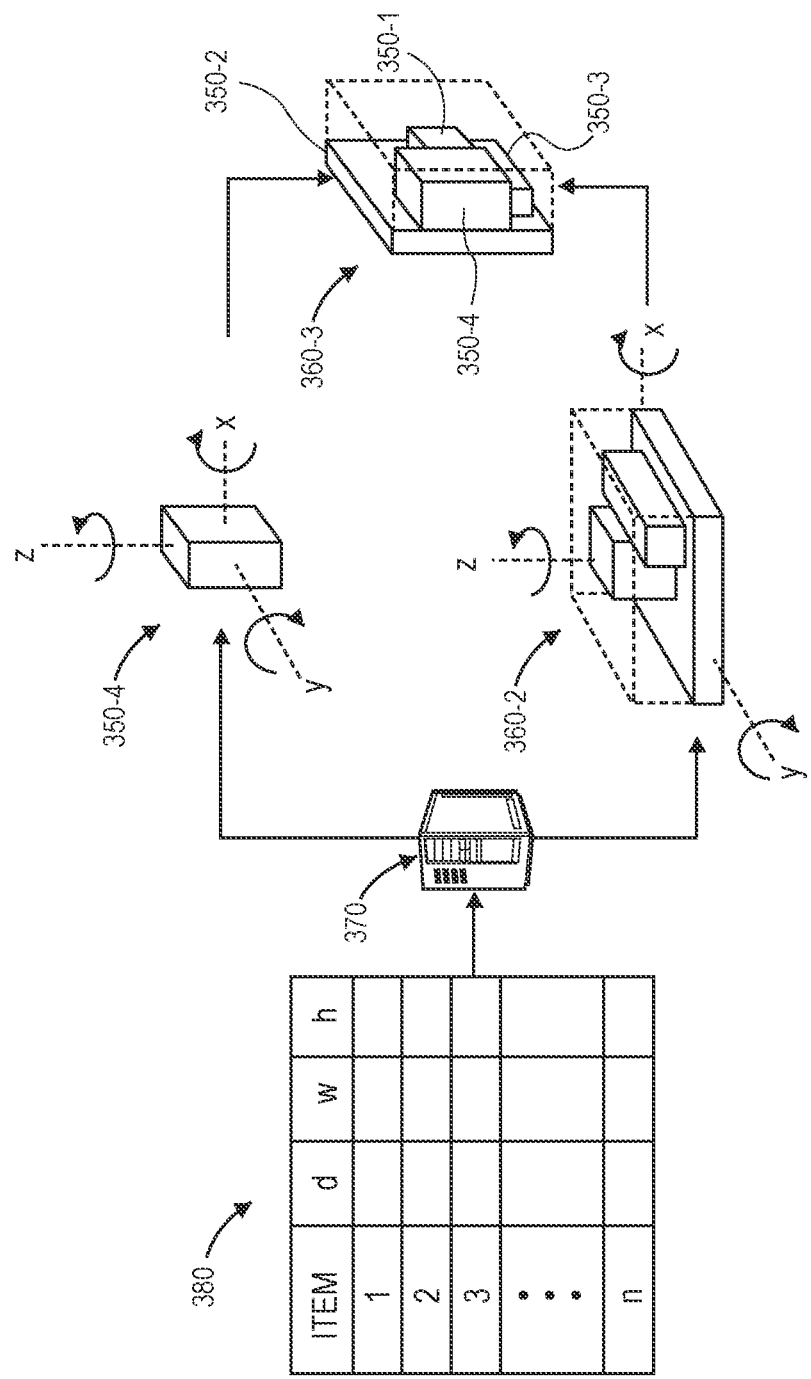

As is shown in FIG. 3D, the server 370 may process the information 380, and any corresponding information regarding the cuboid 360-2, to generate a cuboid 360-3 representing a combination of the item 350-4 and the cuboid 360-2 according to a merge function. The server 370 may select an orientation for each of the item 350-4 and the cuboid 360-2, and determine that the cuboid 360-3 has the minimum dimensions of any combination of the item 350-4 and the cuboid 360-2, or otherwise occupies a smallest volume of any such combination.

Cuboids representing subsets of items, e.g., the cuboids 360-1, 360-2, 360-3, or others, may be generated according to merge functions or in any other manner in accordance with implementations of the present disclosure. Moreover, where one of the cuboids 360-1, 360-2, 360-3 is assigned to a bin of a layer, information regarding the items within the assigned cuboid may be stored in association with the bin and the layer, and any other cuboids representing subsets that include one or more of the items within the assigned cuboid need not be assigned to any bins. For example, where the cuboid 360-1 is assigned to a bin of a layer, one or more files or records may be updated to indicate that the items 350-1, 350-2 are assigned to that bin. The cuboids 360-2, 360-3, meanwhile, need not be assigned to any bins, because the cuboids 360-2, 360-3 also include the items 350-1, 350-2. In such an instance, any other cuboids (not shown) that include or represent the item 350-3 or the item 350-4, but do not include the item 350-1 or the item 350-2, may be assigned to bins.

The systems and methods of the present disclosure are thus directed to optimizing the storage of items in bins or slots of layers of pods by generating subsets of one or more of the items and assigning such subsets to such bins or slots in a manner that maximizes the overall utilization of the available spaces or volumes of the pods, and of such bins or slots, and minimizes the unutilized spaces or volumes within the pod or within such bins or slots. The subsets may be assigned in any manner, e.g., in series, subsets of the items may be assigned to the bins or slots in a manner that maximizes optimization of spaces or volumes, or minimizes unutilized spaces or volumes. For example, in some implementations, subsets of items may be assigned to bins or slots in series, or in a greedy manner, such that a subset of items is assigned to a best or closest fitting bin or slot, and all items in the subset may be deemed assigned to that bin or slot. Each of the subsets including an item may be assigned to one bin or slot, and a match or combination of one subset and one bin or slot that results in the smallest unutilized space or volume may be selected. Subsequently, any other subsets that include any of such items need not be considered for assignment to any other bins or slots. Alternatively, assignments of subsets of items to bins, and the assembly of layers of such bins or slots, may occur at random or at any other time, and in batch processes, or in any other manner that maximizes optimization of spaces or volumes, or minimizes unutilized spaces or volumes. A match or combination of any subset of items and any bin or slot may be made or revisited for any or all of the items, as necessary, to ensure that available space or volume within a pod is maximally optimized, and that unutilized spaces or volumes within the pod are minimized.

Figure 4A:
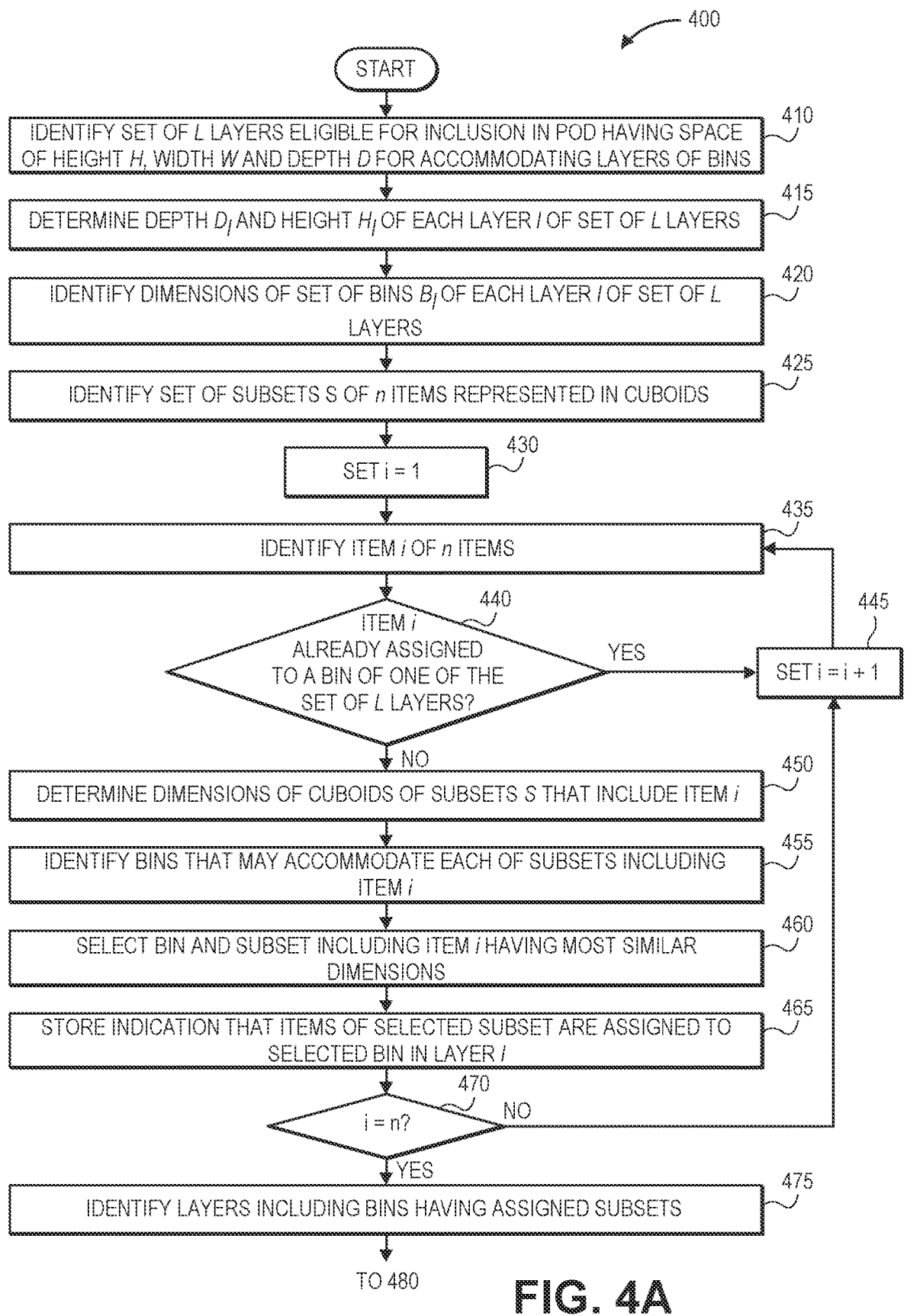
FIGS. 4A and 4B are views of a flow chart of one process for designing storage pods in accordance with embodiments of the present disclosure.
Figure 4B:
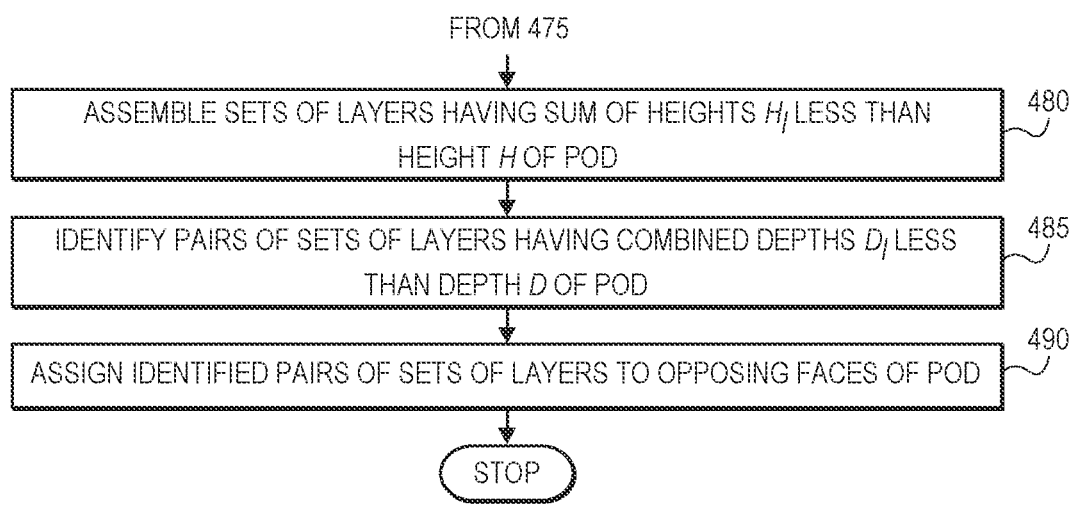

Referring to FIGS. 4A and 4B, views of a flow chart 400 of one process for designing storage pods in accordance with embodiments of the present disclosure are shown.

At box 410, a set of L layers that are eligible for inclusion in a pod having a space (or volume) of height H, a width W and a depth/) for accommodating layers of bins is identified. Each of the I layers may include any number of bins or slots, which may be of any type or form, and may be formed from any suitable materials, e.g., natural or synthetic leathers or canvases, plastics, rubbers, woven or non-woven fabrics, metals, woods, or other materials.

At box 415, a depth $d_l$ and a height $h_l$ of each layer l of the set of L layers are determined. In some implementations, each of the L layers may include bins or slots having a depth $d_l$ or a height $h_l$ that is a discrete or selected fraction of the depth/or the height H, respectively, of the space of the pod. In some implementations, the bins or slots of each of the layers may have a collective or aggregate width that is approximately equal to, and not greater than, the width W.

At box 420, dimensions of each of a set of bins $B_l$ (or slots) of each layer l of the set of L layers are determined. Such dimensions may include an internal height, depth or width of each of the bins $B_l$ of each layer l, as well as an internal volume or mass or weight capacity of each of the bins $B_l$, or any other attributes of such bins, e.g., materials from which each of the bins $B_l$ was formed.

At box 425, a set of subsets S of n items represented in cuboids is identified. For example, each of the subsets S may have been defined according to the process represented in the flow chart 200 of FIG. 2 or as is shown in FIGS. 3A through 3D, or in any other manner. The subsets S may include one or more of the n items, e.g., up to a predetermined maximum number of the n items. Each of the subsets S may be represented as a cuboid, e.g., a solid having six rectangular faces at right angles to each other. For example, shapes of each of the subsets S, or volumes occupied by each of the subsets S, may be assumed to be three-dimensional rectangular solids having a maximum height of the items, a maximum depth of the items and a maximum height of the items.

At box 430, a value of a step variable i is set equal to one, or i=1. At box 435, an item i of the n items is identified.

At box 440, whether the item i has already been assigned to a bin of one of the set of L layers is determined. For example, a file or record associating items with bins or slots and layers may be maintained in one or more data stores. In order to determine whether the item i has been assigned to a bin in one of the L layers may be determined by resort to the file or record.

If the item i has already been assigned to a bin of one of the L layers of the set, then the process advances to box 445, where the value of the step variable i is incremented by one, or set equal to i=1, before returning to box 435, where another item i of the items is identified.

If the item i has not already been assigned to a bin of one of the L layers of the set, then the process advances to box 450, where dimensions of cuboids of the subsets S that include the item i are determined. For example, the item i may have been included in one or more of the subsets S, either independently or with any number of other items, e.g., in a cuboid of two, three, four or another number of items.

At box 455, bins that may accommodate each of the subsets S including the item i are identified. For example, cuboids of the subsets S may be compared to internal dimensions of each of the bins in each of the layers L, to determine whether any of such subsets S may fit into any of such bins.

At box 460, a bin of one of the L layers and a subset of the subsets S having the most similar dimensions are selected. For example, a combination of a subset including the item being placed in a bin that results in the subset with a minimum difference between the volume of the cuboid of the subset and the volume of the bin.

At box 465, an indication that the items of the selected subset are assigned to the selected bin in the layer/is stored in one or more data stores. For example, as is discussed above, a file or record associating items with bins of layers may be updated to indicate that each of the items of the selected subset is deposited in the selected bin within the layer/.

At box 470, whether the value of the step variable i is equal to n, or i=n, is determined.

If the value of the step variable i is not equal to n, thereby indicating that all of the n items have not yet been assigned to any of the bins of any of the L layers, then the process returns to box 445, where the value of the step variable i is incremented by one, or set equal to i=1, before returning to box 435, where another item i of the items is identified.

If the value of the step variable is equal to n, thereby indicating that all of the n items have been assigned to one of the bins of the L layers, then the process advances to box 475, where layers that include bins having one or more of the subsets S assigned thereto are identified.

At box 480, sets of the layers having a collective sum of heights $h_l$ that are less than the height H of the pod are identified. For example, each of the layers to which items have been assigned may be vertically combined into a set in any logical order, such that a combined height of the layers of the set is not greater than the height H of the pod. Any number of combinations of layers into sets may be formed, as necessary, in order to ensure that each of the n items is placed within one bin.

At box 485, pairs of the sets of layers having combined depths $d_l$ that are less than the depth I) of the pod are identified. For example, for each of the sets of layers identified at box 480, a depth of the set may be defined as a maximum depth $d_l$ of one of the layers. Because sets of layers are to be established in opposing exposed faces of the pod, sums of the maximum depths of a pair of sets of layers must be less than the depth I) of the pod, in order to ensure that both of the sets of layers of the pair will fit into the pod.

At box 490, the identified pairs of the sets of layers are assigned to opposing faces of the pod, e.g., for establishment in opposing faces of the pod, and the process ends.

In some implementations, where a set of layers has been identified or selected for a pod, or for a class or type of pods, and each of the set of layers has a height and a depth equal to a discrete fraction of the pod, and bins having widths that are discrete fractions of the pod, the widths of the bins or slots of any of the layers may be adjusted, e.g., according to a local search algorithm, to determine whether any of the bins or slots may be replaced with a bin or a slot having a nominal width without affecting an overall optimization of the pod or the bins or slots. For example, an alternate layer may be selected for each layer that has been identified or selected, with the alternate layer having the same height and depth as the layer, but with bins or slots having widths selected from a set of nominal fractions of the width of the layer, e.g., a single bin or slot occupying one hundred percent of the width of the layer, two bins or slots occupying fifty percent of the layer, or bins or slots having any other portion of the layer. Where an alternate layer selected for a layer would result in an improved or identical utilization of the pod, the alternate layer may be established within the pod in lieu of the layer.

As is noted above, any number of matches or combinations of subsets including an item and bins or slots may be made and updated in an effort to maximize optimization of spaces or volumes of a pod with layers of bins or slots, or minimize unutilized spaces or volumes of the pod. For example, in some implementations, items or subsets of the items may be assigned to layers of bins or slots, and pods (e.g., a single type or class of pod, or multiple types or classes of pods) may be designed to include layers that most efficiently accommodate the items, and maximize the optimization of the spaces or volumes while minimizing unutilized spaces or volumes within such pods.

In some implementations, a variety of different pods (or types or classes of pods) may be designed, with each of the pods including a variety of layers of bins or slots. Items or subsets of items may be assigned to bins or slots of the respective pods, and a most efficient pod of the different pods that optimizes a space or a volume therein may be selected.

Alternatively, subsets of items may be assigned to bins or slots of layers, and such layers may be established within pods, in any other manner and on any other basis.

Referring to FIGS. 5A through 5E, views of aspects of one system for designing storage pods in accordance with embodiments of the present disclosure are shown. Except where otherwise noted, reference numerals preceded by the number "5" in FIGS. 5A through 5E refer to elements that are similar to elements having reference numerals preceded by the number "3" in FIGS. 3A through 3D or by the number "1" shown in FIG. 1.

As is shown in FIG. 5, a frame of a pod 510 has internal dimensions of a height H, a depth D and a width W. In accordance with implementations of the present disclosure, the pod 510 may be designed in a manner to minimize a number of the pods 510 required to store, sort or route items within a facility, e.g., by selecting sets of layers of bins or slots to be established in opposing faces of the pod 510, in order to accommodate any number of subsets 560-1, 560-2, 560-3, 560-4, 560-5 of the items therein. The subsets 560-1, 560-2, 560-3, 560-4, 560-5 may be defined as cuboids, e.g., solids having six rectangular faces at right angles to each other, and may include any number of the items that are to be stored, sorted or routed therein.

Figure 5A:
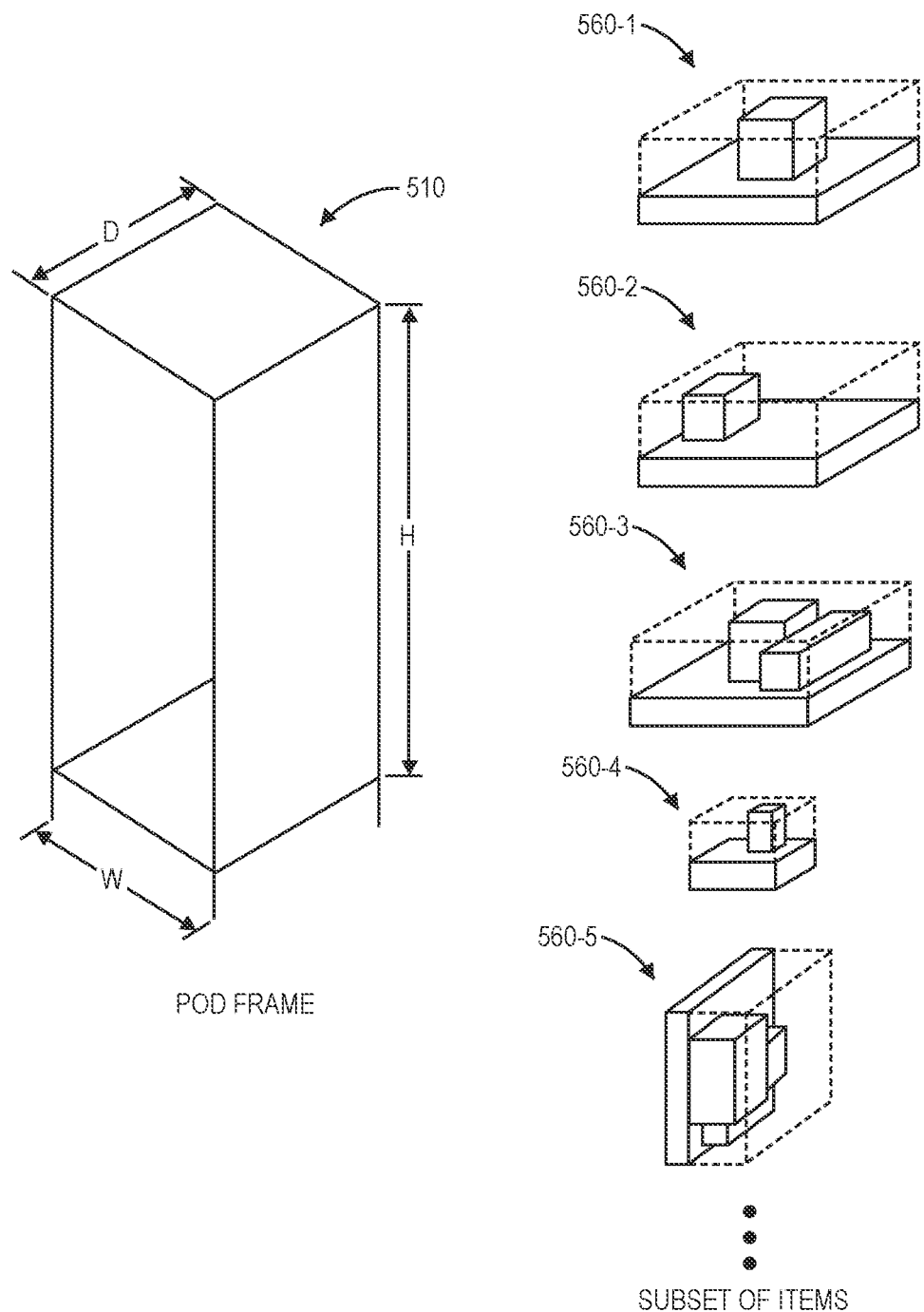
FIGS. 5A through 5E are views of aspects of one system for designing storage pods in accordance with embodiments of the present disclosure.

Although FIG. 5A shows only five subsets 560-1, 560-2, 560-3, 560-4, 560-5 of items, those of ordinary skill in the pertinent arts will recognize that any number of subsets may be defined for a set of items of any size.

Figure 5B:
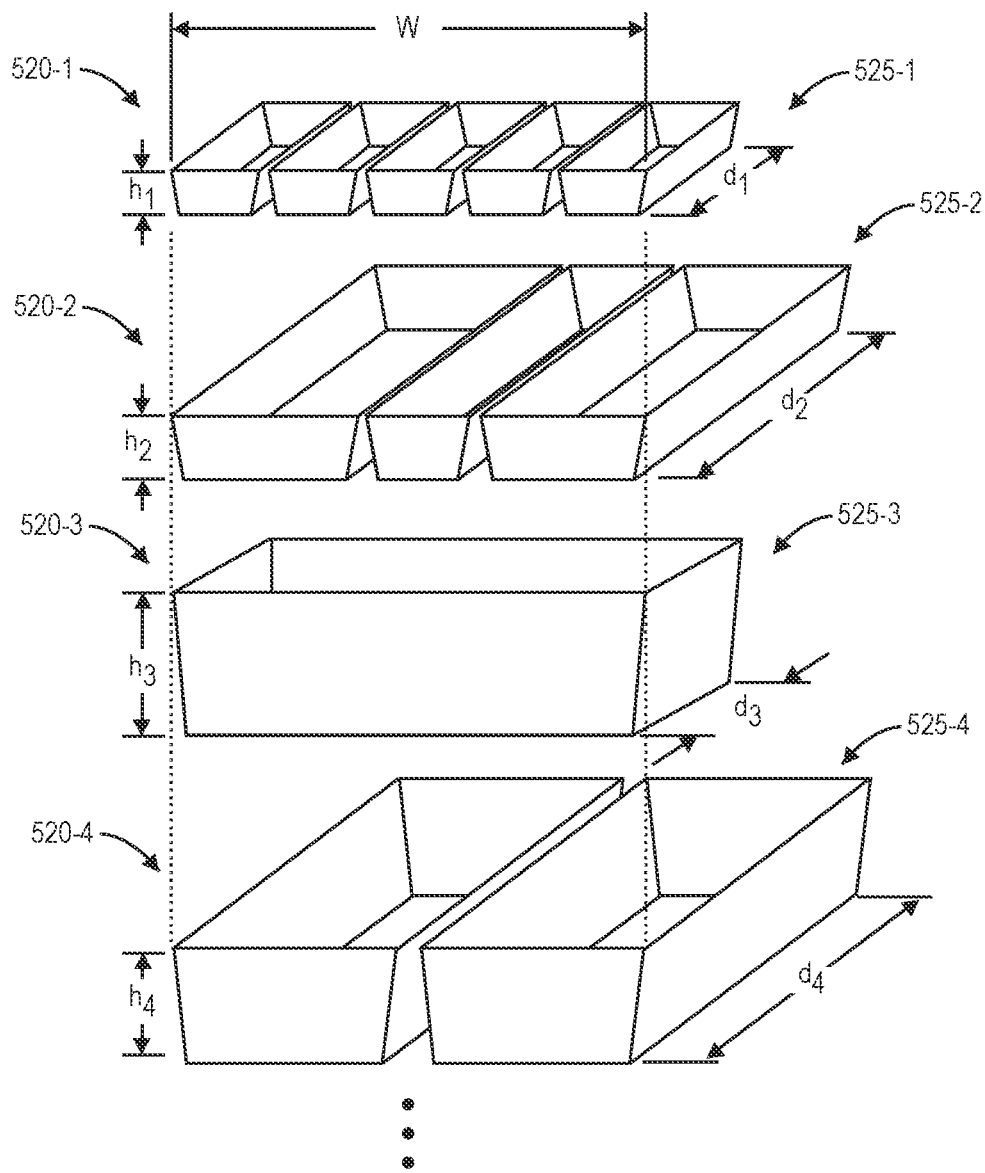

Dimensions of the subsets 560-1, 560-2, 560-3, 560-4, 560-5 of the items may be compared to dimensions of any bins or slots in any layers, and each of the subsets 560-1, 560-2, 560-3, 560-4, 560-5 may be assigned to one of the bins or slots. As is shown in FIG. 5B, a plurality of layers 520-1, 520-2, 520-3, 520-4 are shown. Each of the layers 520-1, 520-2, 520-3, 520-4 includes a set 525-1, 525-2, 525-3, 525-4 of bins (or slots).

As is also shown in FIG. 5B, the bins of the respective sets 525-1, 525-2, 525-3, 525-4 each have common heights and depths. For example, the five bins of the set 525-1 each have a height $h_1$ and a depth $d_1$, while the three bins of the set 525-2 each have a height $h_2$ and a depth $d_2$, the single bin of the set 525-3 has a height $h_3$ and a depth $d_3$, and the two bins of the set 525-4 have a height $h_4$ and a depth $d_4$. As is further shown in FIG. 5B, the aggregate widths of the bins of the sets 525-1, 525-2, 525-3, 525-4 are approximately equal to, and not greater than, the width W of the pod 510.

Figure 5C:
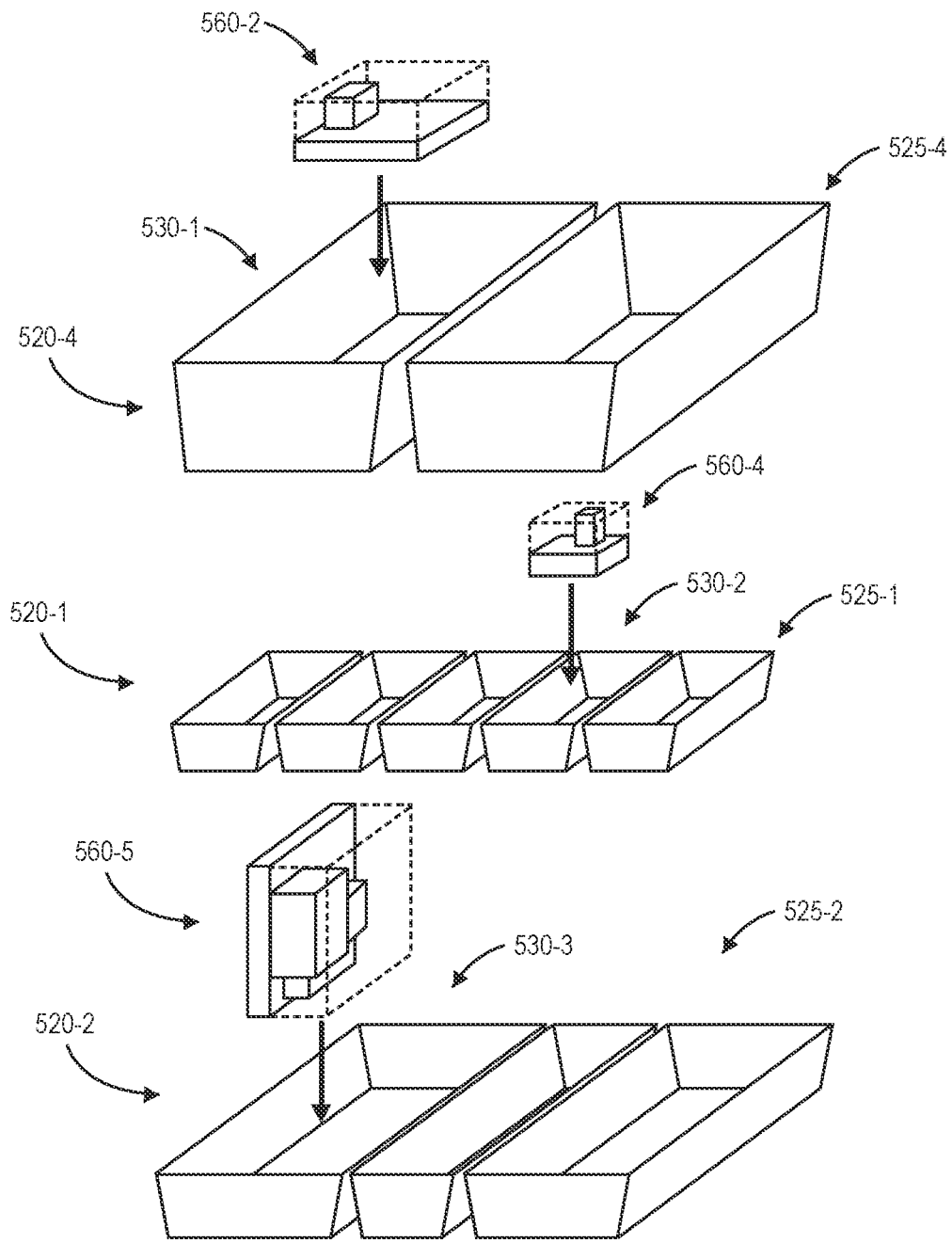

As is shown in FIG. 5C, the subset 560-2 may be assigned to a bin 530-1 (or a slot) of the set 525-4 of bins of the layer 520-4, where the dimensions of the subset 560-2 are determined to be less than the interior dimensions of the bin 530-1, and where assigning the subset 560-2 to the bin 530-1 would result in a minimized unoccupied volume within the bin 530-1. For example, where the subset 560-2 may be accommodated in any number of bins or slots, the subset 560-2 is assigned to the bin 530-1 where a difference between the volume of the subset 560-2 and a volume of the bin 530-1 is smaller than all other differences between the volume of the subset 560-2 and volumes of the other bins or slots.

Similarly, as is also shown in FIG. 5C, the subset 560-4 may be assigned to a bin 530-2 (or a slot) of the set 525-1 of bins of the layer 520-1, where the dimensions of the subset 560-4 are determined to be less than the interior dimensions of the bin 530-2, and where assigning the subset 560-4 to the bin 530-2 would result in a minimized unoccupied volume within the bin 530-2. Likewise, as is further shown in FIG. 5C, the subset 560-5 may be assigned to a bin 530-3 of the set 525-2 of bins of the layer 520-2, where the dimensions of the subset 560-5 are determined to be less than the interior dimensions of the bin 530-3, and where assigning the subset 560-5 to the bin 530-3 would result in a minimized unoccupied volume within the bin 530-3.

Figure 5D:
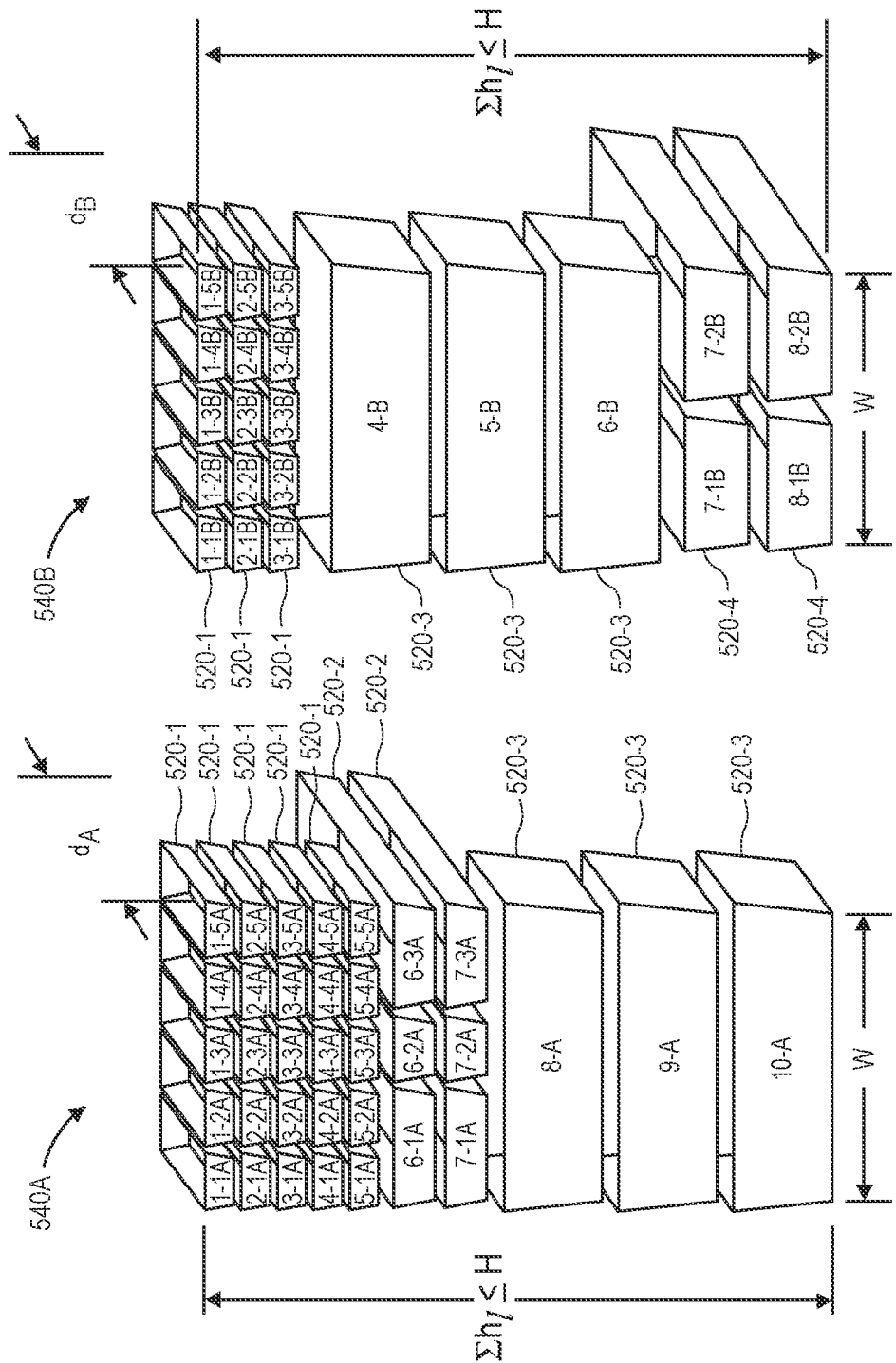

Layers of bins or slots to which items or subsets of items have been assigned may be assembled into sets of bins or slots that may be established within a frame of a pod, e.g., by one of two opposing faces, or in any other manner. As is shown in FIG. 5D, a set 540A of layers includes five of the layers 520-1, two of the layers 520-2 and three of the layers 520-3 arranged vertically. The order of the layers of the set 540A may be selected on any logical basis. Additionally, as is further shown in FIG. 5D, the heights $h_1$ of each of the layers of the set 540A must be less than or equal to the height H of the pod 510 shown in FIG. 5A. The set 540A of layers may also be determined to have a depth da equal to a maximum depth of one of the layers within the set 540A, viz., the layers 520-2.

Similarly, a set 540B of layers includes three of the layers 520-1, three of the layers 520-3 and two of the layers 520-4 arranged vertically, e.g., on any logical basis. Additionally, the heights $h_i$ of each of the layers of the set 540B must be less than or equal to the height H of the pod 510. The set 540B of layers may also be determined to have a depth de equal to a maximum depth of one of the layers within the set 540A, viz., the layers 520-4.

As is also shown in FIG. 5D, each of the respective layers of the sets 540A, 540B includes visual marking or other identifiers provided on an external surface of each of the bins or slots of the respective layers. The identifiers may reference a layer or a bin or slot to which an item or subset has been assigned, as well as a face of a pod in which the layer is, has been or will be established, or any other attribute of the layer, the bin or slot or the pod. In some implementations, when an item or a subset of items has been assigned to a bin or a slot, information associating the item or subset with the bin or the slot and a layer and pod in which the bin or slot is located may be stored, e.g., an identifier corresponding to or consistent with a visual marking provided on the bin or slot, may be stored in one or more files or records maintained in a data store (or multiple data stores). A human (e.g., an associate) or machine may be instructed to travel to a location at which a pod including the bin or slot is located, and to retrieve the item or subset therefrom, or deposit the item or subset therein.

Figure 5E:
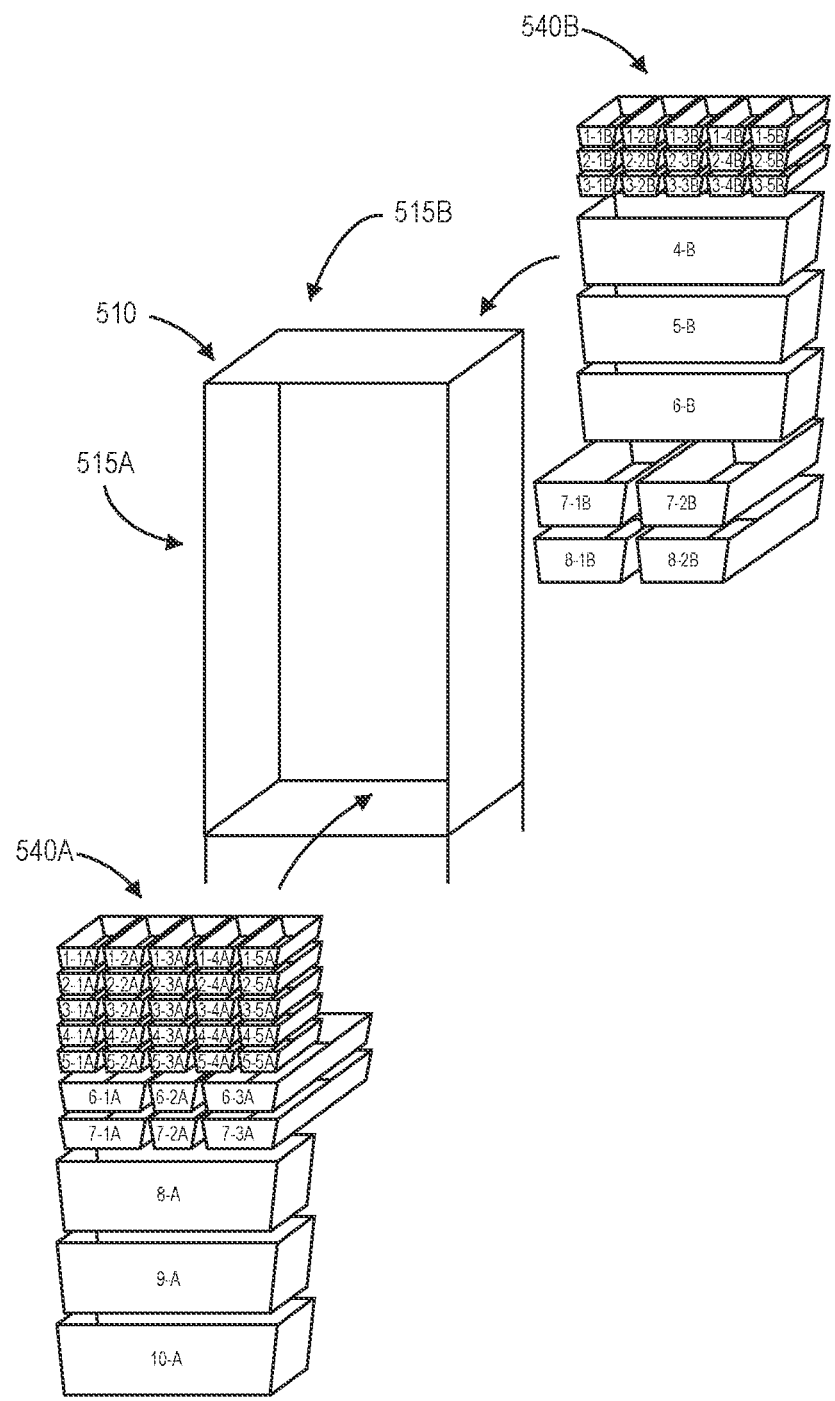

As is shown in FIG. 5E, where a sum of the depth da of the set 540A of layers and the depth de of the set 540B of layers are less than or equal to the depth I) of the pod 510, the set 540A of layers and the set 540B of layers may be established in opposing faces 515A, 515B of the frame of the pod 510. Alternatively, in some implementations, such as where layers of the set 540A or the set 540B have varying depths, sums of depths of layers at common or similar heights or strata within the space or volume defined by the frame of the pod 510 on either of the faces 515A, 515B may not exceed the depth D.

In some implementations, the sets 540A, 540B may be individually or collectively installed or mounted into the pod 510, e.g., by one or more rails, hooks, pins or other systems. Alternatively, in some implementations, each of the layers of the respective sets 540A, 540B may be established by positioning or mounting objects having one or more planar surfaces that are provided within the frame of the pod 510, e.g., into shapes consistent with each of the bins or slots of the sets 540A, 540B of layers shown in FIG. 5D.

Once the sets 540A, 540B are established therein, the pod 510 may be utilized in connection with any application for storing, sorting or routing items in any facility of any type or form.

The process represented in the flow chart 400 of FIG. 4 or the assembly of the sets 540A, 540B of layers or the installation or mounting of such sets 540A, 540B into the frame of the pod 510 may be repeated for any number of items or subsets thereof, and for any number of pods, with a goal of minimizing the number of pods required to accommodate the items or subsets thereof.

Figure 6A:
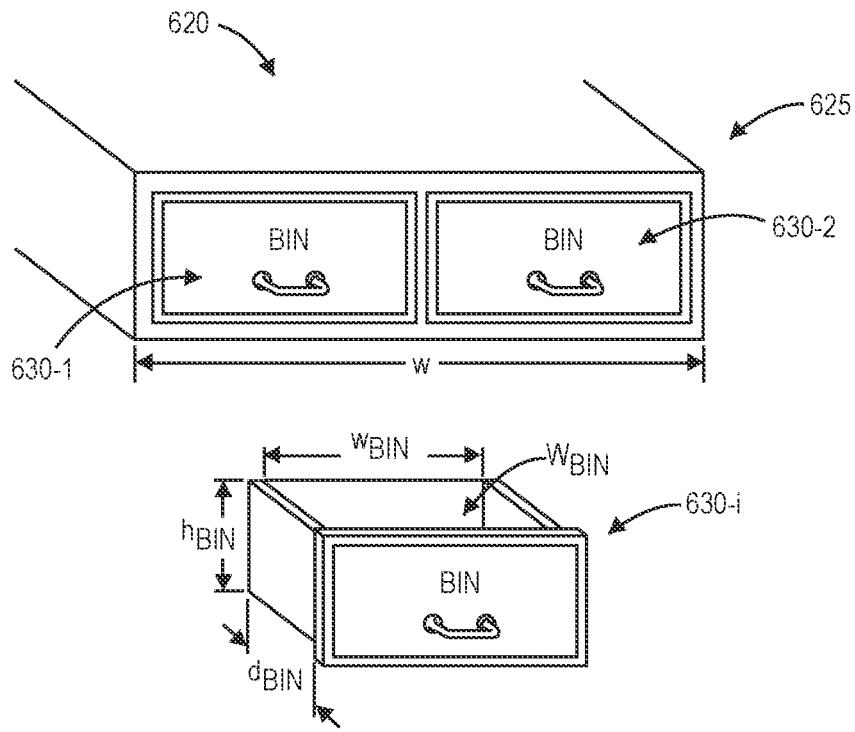
FIGS. 6A and 6B are views of aspects of one system for designing storage pods in accordance with embodiments of the present disclosure.
Figure 6B:
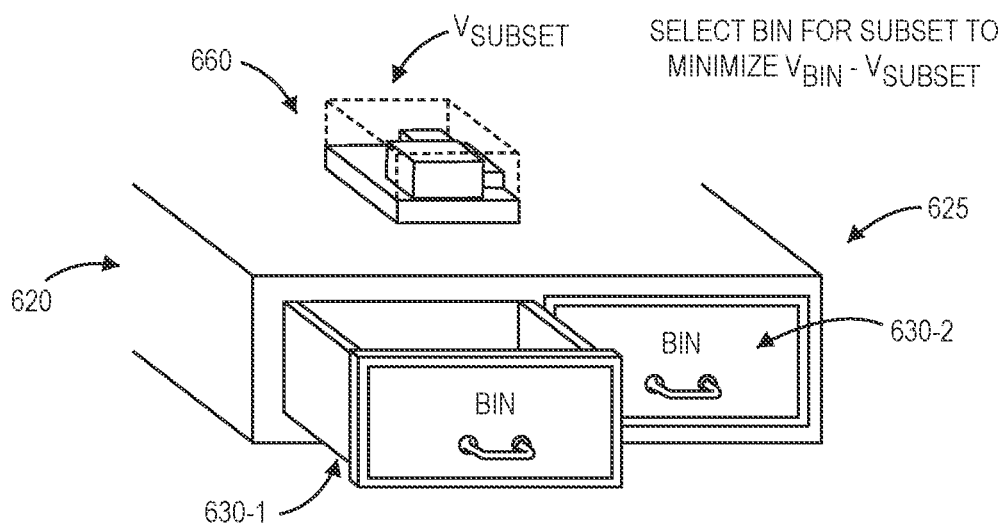

Bins or slots of the present disclosure may be formed or established in any manner, in accordance with implementations of the present disclosure. Referring to FIGS. 6A and 6B, views of aspects of one system for designing storage pods in accordance with embodiments of the present disclosure are shown. Except where otherwise noted, reference numerals preceded by the number "6" in FIG. 6A or 6B refer to elements that are similar to elements having reference numerals preceded by the number "5" in FIGS. 5A through 5E, by the number "3" in FIGS. 3A through 3D or by the number "1" shown in FIG. 1.

As is shown in FIG. 6A, a layer 620 includes a set 625 having a pair of bins 630-1, 630-2. As is further shown in FIG. 6A, a representative bin 630-i of the set 625 includes an interior space having a height $h_{BIN}$, a depth $d_{BIN}$ and a width $w_{BIN}$. A volume $V_{BIN}$ of the bin 630-i may be determined as a product of the height $h_{BIN}$, the depth $d_{BIN}$ and the width $w_{BIN}$. In some implementations, the bins 630-1, 630-2 of the set 625 may be substantially identical to one another, or similar to one another, and may have identical or similar dimensions. In some other implementations, the bins 630-1, 630-2 of the set 625 may be different from one another, and may have different dimensions. Additionally, a width W of the layer may be calculated as a sum of the widths $w_i$ of each of the bins 630-1, 630-2, along with any widths of spaces or gaps between the bins 630-1, 630-2, or between each of the bins 630-1, 630-2 and a corresponding surface of a frame of a pod into which the layer 620 is installed.

As is shown in FIG. 6B, a subset 660 of items having a cuboidal volume $V_{SUBSET}$ may be assigned to the bin 630-1 to minimize a difference between the volume $V_{BIN}$ and the volume $V_{SUBSET}$, i.e., to maximize the optimization of the interior space within the bin 630-1, or to minimize the unutilized space within the bin 630-1.

Figure 7A:
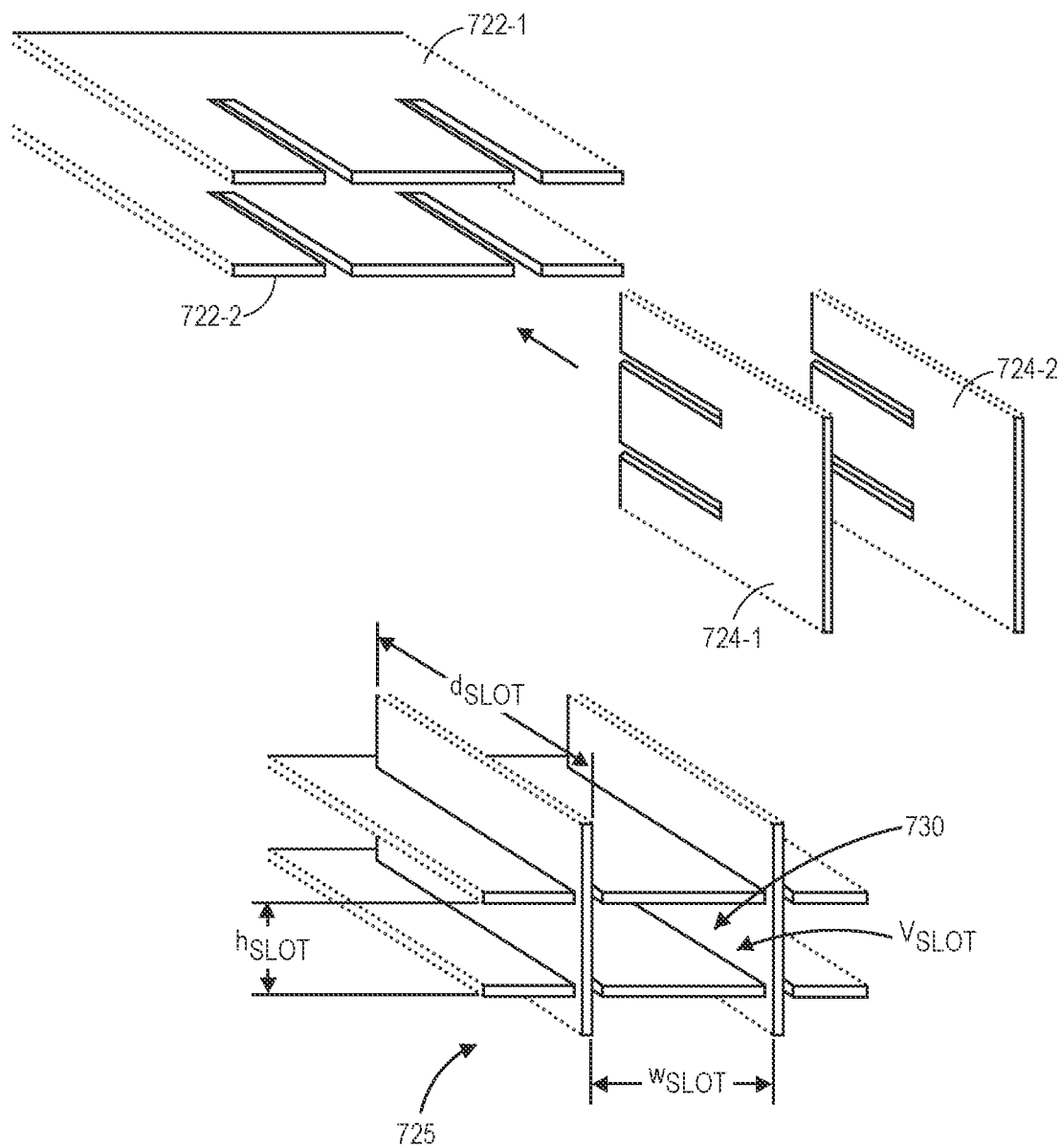
FIGS. 7A and 7B are views of aspects of one system for designing storage pods in accordance with embodiments of the present disclosure.
Figure 7B:
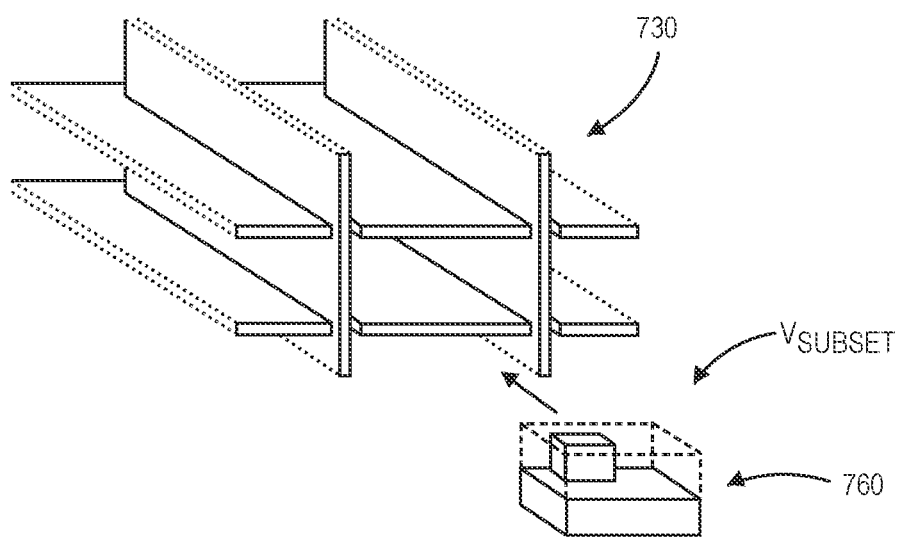

Similarly, referring to FIGS. 7A and 7B, views of aspects of one system for designing storage pods in accordance with embodiments of the present disclosure are shown. Except where otherwise noted, reference numerals preceded by the number "7" in FIG. 7A or 7B refer to elements that are similar to elements having reference numerals preceded by the number "6" in FIG. 6A or 6B, by the number "5" in FIGS. 5A through 5E, by the number "3" in FIGS. 3A through 3D or by the number "1" shown in FIG. 1.

As is shown in FIG. 7A, a set 725 including a slot 730 is formed by two horizontal panels 722-1, 722-2 and two vertical panels 724-1, 724-2, which may include slots, openings or other features for mating the two horizontal panels 722-1, 722-2 with the two vertical panels 724-1, 724-2. The slot 730 has a height $h_{SLOT}$ defined by a distance between an inner surface of the upper panel 722-1 and an inner surface of the lower panel 722-2. The slot 730 has a width $w_{SLOT}$ defined by a distance between an inner surface of a left panel 724-1 and an inner surface of a right panel 724-2. The slot 730 has a depth $d_{SLOT}$ defined by lengths of one or more of the panels 722-1, 722-2 or the panels 724-1, 724-2. A volume $V_{LOT}$ of the slot 730 may be determined as a product of the height $h_{SLOT}$, the depth $d_{SLOT}$ and the width $w_{SLOT}$.

As is shown in FIG. 7B, a subset 760 of items having a cuboidal volume $V_{SUBSET}$ may be assigned to the bin 730 to minimize a difference between the volume $V_{SLOT}$ and the volume $V_{SUBSET}$, i.e., to maximize the optimization of the interior space within the slot 730, or to minimize the unutilized space within the slot 730.

Although some embodiments of the present disclosure describe the design or use of pods within a warehouse, a fulfillment center or a like environment, those of ordinary skill in the pertinent arts will recognize that the systems and methods of the present disclosure may be utilized to design and use pods or other storage units for any purpose and are not limited to use in warehouses, fulfillment centers or other like environments.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:
    determining dimensions of a set of items to be stored in at least one pod within a facility;
    identifying subsets of the set of items, wherein each of the subsets comprises at least one of the items of the set;
    for each one of the items,
        determining a cuboidal volume for the one of the items, wherein the cuboidal volume is defined by a maximum height, a maximum depth and a maximum width of the one of the items; and
        providing information regarding the cuboidal volumes determined for each of the items to a merge function configured to generate cuboidal volumes from orthogonally rotated pairwise mergings of two cuboidal volumes,
    determining cuboidal volumes for each of the subsets by the merge function;
    determining that a first cuboidal volume determined for a first subset of the subsets may be accommodated within internal volumes of each of a first plurality of bins;
    selecting a first bin of the first plurality of bins for the first subset based at least in part on a difference between an internal volume of the first bin and the first cuboidal volume determined for the first subset, and wherein the first bin is associated with a first layer of bins;
    assigning at least the first subset to the first bin;
    determining that a second cuboidal volume determined for a second subset of the subsets may be accommodated within internal volumes of each of a second plurality of bins;
    selecting a second bin of the second plurality of bins for the second subset based at least in part on a difference between an internal volume of the second bin and the second cuboidal volume determined for the second subset, and wherein the second bin is associated with a second layer of bins;
    assigning at least the second subset to the second bin;
    determining a first set of layers of bins, wherein the first set of layers of bins comprises the first layer, wherein the first set of layers of bins has a first depth, and wherein an aggregate height of the first set of layers of bins is not greater than the height of the space;
    determining a second set of layers of bins, wherein the second set of layers of bins comprises the second layer, wherein the second set of layers of bins has a second depth, and wherein an aggregate height of the second set of layers of bins is not greater than the height of the space;
    determining that a sum of the first depth and the second depth is less than a depth of the space; and
    assembling a pod, wherein the pod comprises a frame defining a space for accommodating a plurality of layers of bins, a first exposed face for accessing the space, and a second exposed face for accessing the space, wherein the second exposed face is opposed to the first exposed face, and wherein assembling the pod comprises:
        installing the first set of layers of bins in the space via the first exposed face,
        wherein a width of the first layer of bins corresponds to a width of the space; and
        installing the second set of layers of bins in the space via the second exposed face,
        wherein a width of the second set of layers of bins corresponds to the width of the space,
    wherein the frame is formed from a metal, and
    wherein each one of the plurality of bins is formed from at least one of a canvas, a plastic, a rubber, a fabric or a wood.

2. The method of claim 1, wherein each of the layers of bins has a height that is a predetermined fraction of the height of the space.

3. The method of claim 1, further comprising:
    filtering the subsets having cuboidal volumes that may not be accommodated within any of the first plurality of bins;
    selecting the first subset from the filtered subsets based at least in part on the first cuboidal volume; and
    selecting the second subset from the filtered subsets based at least in part on the second cuboidal volume.

4. The method of claim 1, wherein the first subset of the subsets comprises a first item and a second item, and wherein the method further comprises:
    identifying a plurality of the subsets, wherein each of the plurality of the subsets comprises the first item and the second item;
    calculating volumes of the subsets of the plurality of items comprising the first item and the second item based at least in part on dimensions of items of the subsets, wherein the volumes correspond to cuboids having heights, depths and widths; and
    selecting a subset of the plurality of items having a smallest volume, wherein the first subset is the subset of the plurality of items having the smallest volume.

5. The method of claim 1, wherein the frame is formed from a metal, and
    wherein each one of the bins is formed from at least one of a canvas, a plastic, a rubber, a fabric or a wood.

6. A method comprising:
    identifying a plurality of items to be stored within a facility;
    determining dimensions of each of the plurality of items, wherein the dimensions include at least one height, at least one width and at least one depth of each of the items;
    determining cuboidal shapes for each of the plurality of items based at least in part on the dimensions of each of the plurality of items, wherein each of the cuboidal shapes is defined by a maximum of the at least one height, a maximum of the at least one width and a maximum of the at least one depth for each of the plurality of items;
    providing information regarding the cuboidal shapes determined for each of the plurality of items to a merge function configured to generate cuboidal shapes from orthogonally rotated pairwise mergings of two cuboidal shapes;
    generating the first cuboid according to the merge function based at least in part on information regarding a second cuboid determined for the first item and a third cuboid determined for a second item;
    calculating at least a first volume based at least in part on dimensions of a first subset of the plurality of items, wherein the first volume corresponds to a first cuboid having a first height, a first depth and a first width, and wherein the first subset comprises a first item of the plurality of items;
    determining that the first volume may be accommodated within an interior space of each of a first plurality of bins based at least in part on volumes of interior spaces of each of the first plurality of bins;

selecting a first bin of the first plurality of bins based at least in part on a second volume of an interior space of the first bin, wherein the second volume is a smallest of the volumes of the interior spaces of each of the first plurality of bins; and installing a first set of layers in a first face of a frame of a pod, wherein each of the first set of layers includes at least one bin, wherein each of the first set of layers has a height and a depth corresponding to the at least one bin and a width corresponding to an interior width of the first face of the frame, wherein an aggregate height of the first set of layers corresponds to an interior height of the first face of the frame, and wherein the first set of layers includes a first layer comprising the first bin.

7. The method of claim 6, further comprising:

calculating at least a third volume based at least in part on dimensions of a second subset of the plurality of items, wherein the third volume corresponds to a second cuboid having a second height, a second depth and a second width, and wherein the second subset comprises a second item of the plurality of items;

determining that the second volume may be accommodated within an interior space of each of a second plurality of bins based at least in part on volumes of interior spaces of each of the second plurality of bins;

selecting a second bin of the second plurality of bins based at least in part on a fourth volume of an interior space of the second bin, wherein the fourth volume is a smallest of the volumes of the interior spaces of each of the second plurality of bins; and installing a second set of layers in a second face of the frame, wherein each of the second set of layers includes at least one bin, wherein each of the second set of layers has a height and a depth corresponding to the at least one bin and a width corresponding to an interior width of the second face of the frame, wherein an aggregate height of the second set of layers corresponds to an interior height of the second face of the frame, wherein the second set of layers includes a second layer comprising the second bin, and wherein the second face is opposite the first face.

8. The method of claim 7, further comprising:

determining a first depth of the first set of layers based at least in part on dimensions of each of the first plurality of bins, wherein the first depth is a depth of a bin of one of the first set of layers;

determining a second depth of the second set of layers based at least in part on dimensions of each of the second plurality of bins, wherein the second depth is a depth of a bin of one of the second set of layers; and determining that a sum of the first depth and the second depth is not greater than an interior depth of the frame, wherein the first set of layers are installed in the first face of the frame and the second set of layers are installed in the second face of the frame in response to determining that the sum of the first depth and the second depth is not greater than the interior depth of the frame.

9. The method of claim 6, wherein the frame is a rigid structure formed from a metal defining the interior height of the first face, the interior height of the second face, the interior depth of the frame and the interior width.

10. The method of claim 6, wherein each of the first plurality of bins has a height that is a predetermined fraction of the interior height of the first face of the frame.

11. The method of claim 6, wherein each of the plurality of bins is formed from at least one of a canvas, a fabric, a metal, a plastic, a rubber or a wood.

12. The method of claim 6, wherein the first subset of the first plurality of items comprises the first item and a second item, and wherein the method further comprises:

identifying a plurality of subsets of the plurality of items, wherein each of the plurality of subsets comprises the first item and the second item;

calculating volumes of the subsets of the plurality of items based at least in part on dimensions of items of the subsets, wherein the volumes correspond to cuboids having heights, depths and widths; and selecting a subset of the plurality of items having a smallest volume, wherein the first subset is the subset of the plurality of items having the smallest volume.

13. A method comprising:

identifying a plurality of items to be stored within a facility;

determining dimensions of each of the plurality of items, wherein the dimensions include at least one height, at least one width and at least one depth of each of the plurality of items;

for each item of the plurality of items;

determining cuboidal shapes for each of a first plurality of pairs of items that do not include the item according to a merge function, wherein each of the cuboidal shapes is determined for each of the first plurality of pairs of items based at least in part on cuboidal shapes of the items of the first plurality of pairs;

determining cuboidal shapes for each of a first plurality of triplets of items according to a merge function, wherein each of the cuboidal shapes is determined for each of the first plurality of triplets based at least in part on a cuboidal shape of one of the first plurality of pairs of items and a cuboidal shape of one of the plurality of items that is not the item;

determining cuboidal shapes for each of a second plurality of pairs of items that include the item according to a merge function, wherein each of the cuboidal shapes is determined for each of the second plurality of pairs of items based at least in part on cuboidal shapes of the items of the second plurality of pairs;

determining cuboidal shapes for each of a second plurality of triplets of items according to a merge function, wherein each of the cuboidal shapes is determined for each of the second plurality of triplets based at least in part on one of:

a cuboidal shape of one of the first plurality of pairs of items and a cuboidal shape of the item; or a cuboidal shape of one of the second plurality of pairs of items and a cuboidal shape of one of the plurality of items that is not the item;

determining cuboidal shapes for a plurality of quadruplets of items according to a merge function, wherein each of the cuboidal shapes is determined for each of the plurality of quadruplets based at least in part on one of:

a cuboidal shape of one of the first plurality of triplets of items and a cuboidal shape of the item;

a cuboidal shape of one of the first plurality of pairs of items and a cuboidal shape of one of the second plurality of pairs of items; or a cuboidal shape of one of the second plurality of triplets of items and a cuboidal shape of one of the plurality of items that is not the item, wherein the method further comprises:

selecting a first cuboid from a set comprising the cuboidal shape determined for the item, the cuboidal shapes determined for the second plurality of pairs of items, the cuboidal shapes corresponding to the second plurality of triplets of items, and the cuboidal shapes corresponding to the plurality of quadruplets of items;

calculating at least a first volume based at least in part on dimensions of a first subset of the plurality of items, wherein the first volume corresponds to the first cuboid having a first height, a first depth and a first width, and wherein the first subset comprises a first item of the plurality of items;

determining that the first volume may be accommodated within an interior space of each of a first plurality of bins based at least in part on volumes of interior spaces of each of the first plurality of bins;

selecting a first bin of the first plurality of bins based at least in part on a second volume of an interior space of the first bin, wherein the second volume is a smallest of the volumes of the interior spaces of each of the first plurality of bins; and installing a first set of layers in a first face of a frame of a pod, wherein each of the first set of layers includes at least one bin, wherein each of the first set of layers has a height and a depth corresponding to the at least one bin and a width corresponding to an interior width of the first face of the frame, wherein an aggregate height of the first set of layers corresponds to an interior height of the first face of the frame, and wherein the first set of layers includes a first layer comprising the first bin.

14. The method of claim 13, further comprising:

filtering cuboidal shapes having volumes that may not be accommodated within any of the plurality of bins from the set, wherein the first cuboid is selected from the filtered set.

15. A method comprising:

identifying a set of items to be stored within a facility; and determining a number of pods required to store the set of items within the facility, wherein determining the number of pods comprises:

determining dimensions of each of the items of the set;

determining cuboidal volumes for each of the items of the set;

generating subsets of the items, wherein each of the subsets of the items includes at least one of the items of the set;

providing information regarding each of the cuboidal volumes generated for each of the items as inputs to a merge function configured to generate cuboidal volumes from orthogonally rotated pairwise mergings of two cuboidal volumes;

generating cuboidal volumes for each of the subsets of items, wherein each of the cuboidal volumes is generated for each of the subsets of items based at least in part on an output of the merge function;

for each of the subsets of items, determining dimensions of each of a plurality of bins;

identifying at least one bin of the plurality of bins into which a subset of items may be accommodated based at least in part on the cuboidal volumes generated for each of the subsets of items; and assigning the subset of items to one of the plurality of bins, wherein the one of the plurality of bins is associated with a layer of bins;

determining a number of layers of bins having at least one subset of the items assigned to one of the bins of one of the layers;

generating pairs of sets of the layers of bins having the at least one subset of the items assigned to one of the bins of one of the layers; and constructing a plurality of pods, wherein each one of the plurality of pods comprises a frame having a common interior depth, a common interior height, and a common interior width, and wherein constructing the plurality of pods comprises:

assembling each one of the pairs of sets of the layers of bins in opposing faces of a frame of one of the plurality of pods, and wherein the number of pods is a number of the plurality of pods.

16. The method of claim 15, further comprising:

identifying cuboidal volumes generated for each of the subsets of the items that may not be accommodated within any of the plurality of bins, wherein the subsets of items assigned to the plurality of bins do not include any of the subsets of items having cuboidal volumes that may not be accommodated within any of the plurality of bins.

17. The method of claim 15, further comprising:

identifying a plurality of the subsets of items comprising a first item of the set and a second item of the set;

identifying cuboidal volumes generated for each of the subsets of items comprising the first item of the set and the second item of the set; and selecting one of the plurality of the subsets of the items having a smallest cuboidal volume, wherein the at least some of the subsets of items assigned to the plurality of bins includes the selected one of the plurality of the subsets and does not include any of the subsets of items that do not have the smallest cuboidal volume.

18. The method of claim 15, wherein generating the pairs of sets of the layers comprises:

identifying a first set of layers of bins having the at least one subset of the items assigned to one of the bins of one of the layers;

determining a first maximum depth of the first set of layers of bins;

identifying a second set of layers of bins having the at least one subset of the items assigned to one of the bins of one of the layers;

determining a second maximum depth of the second set of layers of bins; and determining that a sum of the first maximum depth and the second maximum depth is less than the common interior depth, wherein a pair of sets of layers comprising the first set of layers and the second set of layers is assembled in a frame of one of the plurality of pods, wherein the first set of layers is assembled in a first face of the one of the plurality of pods, wherein the second set of layers is assembled in a second face of the one of the plurality of pods, and wherein the first face opposes the second face in the one of the plurality of pods.

19. The method of claim 15, wherein each of the plurality of bins has a height that is a predetermined fraction of the common interior height.

20. The method of claim 15, wherein each one of the plurality of frames is formed from a metal, and
   wherein each one of the plurality of bins is formed from at least one of a canvas, a plastic, a rubber, a fabric or a wood.

21. The method of claim 6, wherein installing the first set of layers in the first face of the frame of the pod comprises:
   arranging a plurality of panels in the first face of the frame of the pod, wherein arranging the plurality of panels comprises:
   installing at least a first panel in a substantially horizontal orientation within the first face of the frame of the pod, wherein the first panel is one of the plurality of panels, and wherein a length of the first panel is approximately equal to the interior width of the first face of the frame;
   installing at least a second panel in a substantially horizontal orientation within the first face of the frame of the pod, wherein the second panel is one of the plurality of panels, and wherein a length of the second panel is approximately equal to the interior width of the first face of the frame;
   installing at least a third panel in a substantially vertical orientation within the first face of the frame of the pod, wherein the third panel is one of the plurality of panels, and wherein the third panel is installed in contact with each of the first panel and the second panel within the first face of the frame,
   wherein each one of the panels is formed from one of a metal, a plastic or a wood.

22. The method of claim 6, wherein the pod is configured for mounting onto an autonomous mobile robot configured to transport at least the pod within the facility.

* * * * *